(12) United States Patent
Gaben et al.

(10) Patent No.: US 10,047,451 B2
(45) Date of Patent: Aug. 14, 2018

(54) METHOD FOR MANUFACTURING ALL-SOLID-STATE THIN-FILM BATTERIES

(71) Applicant: I-TEN, Champagne-au-Mont-d'Or (FR)

(72) Inventors: Fabien Gaben, Ecully (FR); Frédéric Bouyer, Perrigny les Dijon (FR); Bruno Vuillemin, Darbonnay (FR)

(73) Assignee: I-TEN, Champagne-au-mont-d'or (FR)

( * ) Notice: Subject to any disclaimer, the term of this patent is extended or adjusted under 35 U.S.C. 154(b) by 211 days.

(21) Appl. No.: 14/355,125

(22) PCT Filed: Oct. 30, 2012

(86) PCT No.: PCT/FR2012/052514
§ 371 (c)(1),
(2) Date: Apr. 29, 2014

(87) PCT Pub. No.: WO2013/064779
PCT Pub. Date: May 10, 2013

(65) Prior Publication Data
US 2014/0308576 A1    Oct. 16, 2014

(30) Foreign Application Priority Data

Nov. 2, 2011 (FR) ...................... 11 59886

(51) Int. Cl.
*H01M 10/0525* (2010.01)
*C25D 13/12* (2006.01)
(Continued)

(52) U.S. Cl.
CPC ............... *C25D 13/12* (2013.01); *C25D 5/10* (2013.01); *C25D 13/02* (2013.01); *C25D 13/22* (2013.01);
(Continued)

(58) Field of Classification Search
CPC ........ C25D 13/12; C25D 15/00; C25D 13/22; C25D 13/02; C25D 5/10; C25D 5/50;
(Continued)

(56) References Cited

U.S. PATENT DOCUMENTS 6,607,645 B1    8/2003  Sarkar
7,662,265 B2    2/2010  Chiang et al.
(Continued)

FOREIGN PATENT DOCUMENTS

JP      2002 042790 A     2/2002
JP      2002 042792 A     2/2002
WO      2008/089110 A1    2/2010

OTHER PUBLICATIONS

Machine English translation to JP 2002-042790 to Denko Corp.*
(Continued)

*Primary Examiner* — Michael L Dignan
(74) *Attorney, Agent, or Firm* — Jordan IP Law, LLC; Todd A. Vaughn

(57) ABSTRACT

A process for fabrication of all-solid-state thin film batteries, may include batteries including a film of anode materials, a film of solid electrolyte materials and a film of cathode materials. Each of these three films may be deposited using an electrophoresis process. The anode film and the cathode film may each be deposited on a conducting substrate, preferably a thin metal sheet or band, or a metalized insulating sheet or band or film. The conducting substrates or their conducting elements may be useable as battery current collectors, the electrolyte film may be deposited on the anode and/or cathode film. The process may also include stacking the sheets or bands so as to form at least one battery with a "collector/anode/electrolyte/cathode/collector" type of stacked structure.

23 Claims, 20 Drawing Sheets

(51) Int. Cl.

| | |
|---|---|
| *C25D 13/02* | (2006.01) |
| *H01M 4/04* | (2006.01) |
| *H01M 4/139* | (2010.01) |
| *H01M 4/1391* | (2010.01) |
| *H01M 4/66* | (2006.01) |
| *H01M 10/0585* | (2010.01) |
| *C25D 5/10* | (2006.01) |
| *C25D 13/22* | (2006.01) |
| *C25D 15/00* | (2006.01) |
| *H01M 4/485* | (2010.01) |
| *H01M 10/0562* | (2010.01) |
| *C25D 5/50* | (2006.01) |

(52) U.S. Cl.
CPC .......... *C25D 15/00* (2013.01); *H01M 4/0402* (2013.01); *H01M 4/0457* (2013.01); *H01M 4/139* (2013.01); *H01M 4/1391* (2013.01); *H01M 4/661* (2013.01); *H01M 4/667* (2013.01); *H01M 10/0525* (2013.01); *H01M 10/0585* (2013.01); *C25D 5/50* (2013.01); *H01M 4/043* (2013.01); *H01M 4/485* (2013.01); *H01M 10/0562* (2013.01); *Y02T 10/7011* (2013.01); *Y10T 29/49115* (2015.01)

(58) Field of Classification Search
CPC .. H01M 4/1391; H01M 4/139; H01M 4/1393; H01M 4/0402; H01M 4/0457; Y10T 29/49115
See application file for complete search history.

(56) References Cited

U.S. PATENT DOCUMENTS

| | | | |
|---|---|---|---|
| 7,828,619 B1* | 11/2010 | Yeh .................. | B82Y 30/00 445/49 |
| 2004/0185336 A1* | 9/2004 | Ito .................. | H01M 4/667 429/152 |
| 2009/0214957 A1* | 8/2009 | Okada ............... | H01M 4/5825 429/319 |
| 2009/0290288 A1* | 11/2009 | Mitchell ............ | H01G 9/058 361/502 |
| 2010/0040948 A1* | 2/2010 | Takano .............. | H01M 4/13 429/209 |

OTHER PUBLICATIONS

Machine English translation to JP 2002-042792 to Denko Corp.*
Ferrari et al, "EPD of thick films for their application in lithium batteries", Journal of the European Ceramic Society, Jan. 1, 2007, pp. 3823-3827, vol. 27 No. 13-15, Elsevier Science Publishers, Great Britain.

* cited by examiner

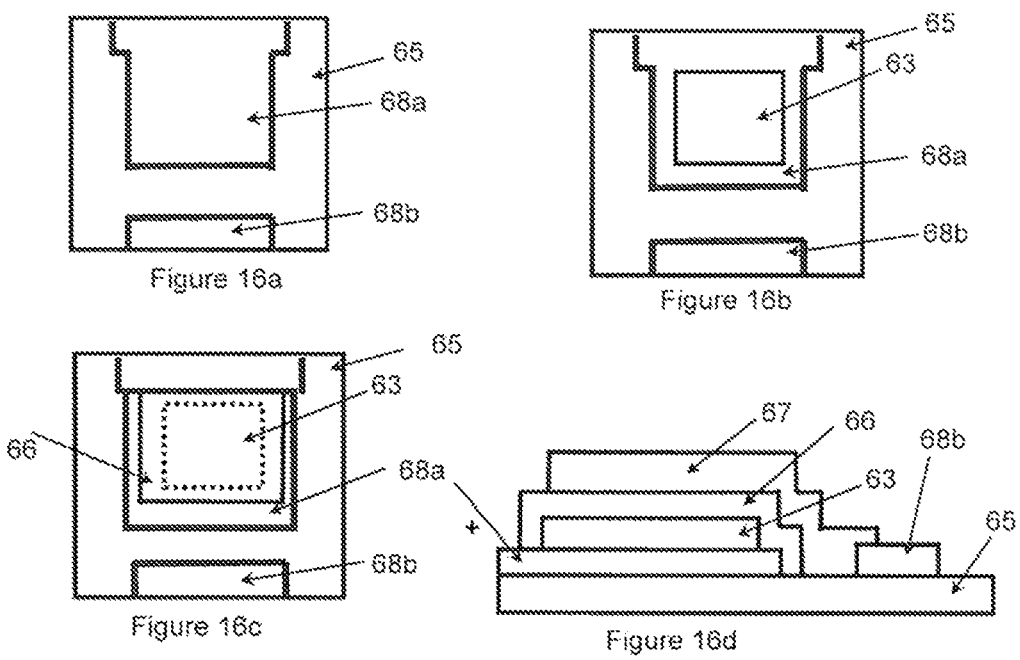

Figure 16a, Figure 16b, Figure 16c, Figure 16d

| Make a colloidal suspension of the materials to be deposited |
|---|

↓

| Bring the surface to be coated and the colloidal suspension into contact |
|---|

↓

| Apply an electric field between the surface to be coated and a counter-electrode also located in the colloidal suspension for as long as necessary to obtain the required deposited thickness |
|---|

↓

| Dry the coating |
|---|

↓

| Sinter and/or compact the coating |
|---|

Figure 17

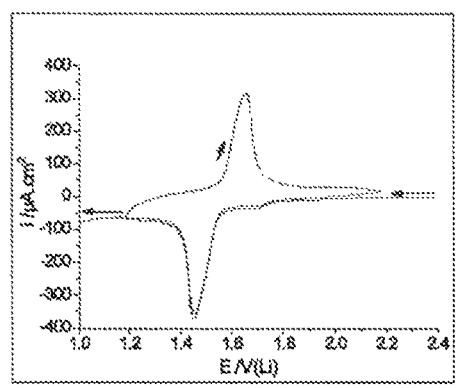
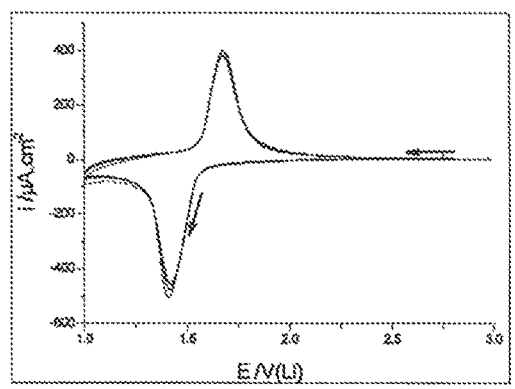
Figure 23a      Figure 23b
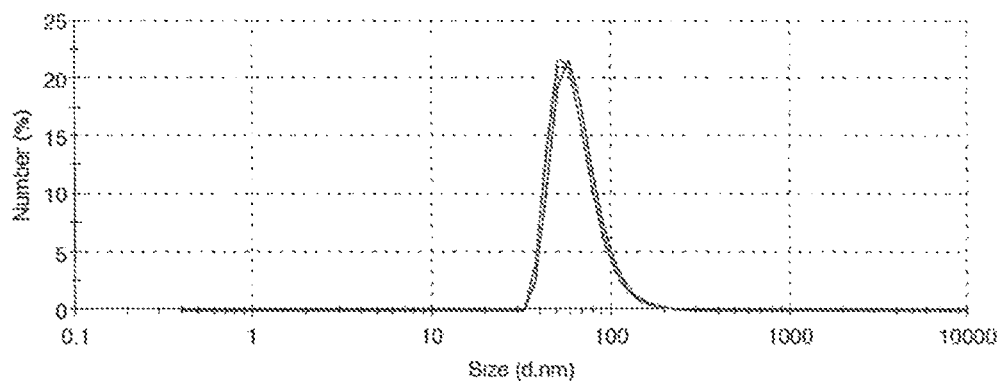
Figure 24

METHOD FOR MANUFACTURING ALL-SOLID-STATE THIN-FILM BATTERIES

FIELD OF THE INVENTION

This invention relates to the field of batteries and particularly lithium ion batteries. It most particularly concerns all-solid-state lithium ion batteries and a new process for making such batteries in thin films.

STATE OF THE ART

The ideal battery for supplying power to standalone electrical devices (such as telephones and laptop computers, portable tools, standalone sensors), or for traction of electrical vehicles would have long life, would be capable of storing large quantities of energy and power and there would be no risk of overheating or possibly even explosion.

At the present time, these electrical devices are powered essentially by lithium ion batteries (herein called "Li-ion" batteries) that have the best energy density among the various proposed storage technologies. However, Li-ion batteries can be made using different architectures and with different chemical compositions of their electrodes.

Processes for making Li-ion batteries are presented in many articles and patents and the "Advances in Lithium-Ion Batteries" book (published by W. van Schalkwijk and B. Scrosati) in 2002 (Kluever Academic/Plenum Publishers) gives a good inventory of these processes. Li-ion battery electrodes can be made using printing techniques (particularly roll coating, doctor blade, tape casting). These techniques can be used to make deposits between 50 and 400 µm thick. The power and energy of the battery can be modulated, by varying the thickness of the deposits and their porosity and the size of active particles. Inks (or pastes) deposited to form electrodes contain particles of active materials and also binders (organic), carbon powder to make the electrical contact between particles, and solvents that are evaporated during the electrode drying step. A calendering step is performed on the electrodes to improve the quality of electrical contacts between particles and to compact the deposits. After this compression step, active particles of the electrodes occupy about 60% of the volume of the deposit, which means that there is usually 40% porosity between particles. Pores are filled with an electrolyte.

These batteries also comprise a separator placed between the anode and the cathode.

The separator is a porous polymer film about 20 µm thick. The electrolyte will be added during the final assembly of the battery when the anode and the cathode are stacked or rolled with the separator between them. The electrolyte migrates into the pores contained in the separator and also in the electrodes and thus provides ionic conduction between the electrodes. It may be liquid (aprotic solvent in which a lithium salt is dissolved) or in the form of a more or less polymerized gel impregnated with a lithium salt. Binders used in the formulation of inks also contribute to the transport of lithium ions. They are impregnated with electrolyte that may be either an aprotic organic solvent containing a lithium salt or an ionic liquid.

The power and energy of a battery may be varied by varying the thickness of the deposits and the size and density of the active particles contained in the ink. An increase in the energy density is necessarily at the detriment of the power density. High power battery cells necessitate the use of thin very porous electrodes and separators, while on the contrary an increase in the energy density is achieved by increasing these thicknesses and reducing the porosity. The article "*Optimization of Porosity and Thickness of a Battery Electrode by Means of a Reaction-Zone Model*" by John Newman, published in J. Electrochem. Soc., Vol. 142, No. 1 in January 1995, demonstrates the corresponding effects of electrode thicknesses and their porosity on their discharge rate (power) and energy density.

However, an increase in porosity tends to increase risks of short circuits internal to the battery cell. Metal lithium can precipitate in the pores. Similarly, if electrode particles are too small, they can detach from the electrode and migrate into these pores.

Furthermore, electrolytes based on organic solvents and lithium salts tend to degrade (oxidize) under the effect of high electrical potentials and/or excessive temperatures and traces of humidity. This degradation can be slow and continuous during exposure of the battery cell to a temperate external environment (aging) but it can also become fast and sudden in the case of overheating or overload. Evaporation and combustion of this electrolyte can then initiate a violent reaction that can cause the cell to explode.

Dense polymer films conducting lithium ions may be used as separators to reduce these risks. These films are also more resistive and they must be thin to not degrade performances of the battery excessively because their ionic conductivity is low. Current techniques for the fabrication of polymer films and their poor mechanical properties make it impossible to obtain thicknesses of less than 30 µm to 40 µm. For example this is disclosed in patent application WO 2004/051769 (Avestor Ltd Partnership). Ceramic particles that might conduct lithium ions have been added as disclosed in patent application EP 1 049 188 A1 (Ohara KK) to improve the mechanical properties of polymer films. However, film thicknesses obtained are still close to 20 µm. Patent application EP 1 424 743 A1 (Ohara KK) discloses the deposition of an electrolyte film directly onto the surface of the electrodes in order to further reduce these film thicknesses. One of the processes disclosed consists of coating the surface of an electrode with an ink containing a polymer electrolyte and particles of inorganic solid electrolyte conducting lithium ions.

Furthermore, polymer films obtained by these techniques only cover electrode surfaces, while electrode edges remain bare. The dielectric insulation on the edges of the cells is not perfect and depends on the mechanical stresses and the precision with which these films are placed. This can give rise to small leakage currents that can induce a self-discharge phenomenon or even a short circuit internal to the cell.

Furthermore, the use of organic electrolytes containing lithium salts limits the choice of electrode materials that can be used, because most of them react to the strongly reducing or oxidizing potentials of anodes and cathodes.

Another process for making electrolyte and electrode films has been proposed. This is to deposit a thin film of ceramics or vitro-ceramics conducting lithium ions and lithium insertion electrode materials under a vacuum. This technique can give dense films with no porosity and consequently excellent mechanical properties preventing the occurrence of internal short circuits in the battery. The absence of porosity means that lithium ions can be transported through the film by diffusion, without the need to use organic polymer-based or solvent-based electrolytes containing lithium salts. Such films can cover the entire electrode including its edges.

Such all-inorganic films confer excellent aging, safety and temperature resistance properties.

Furthermore, there are many advantages in manufacturing of dense high quality thin films with a more or less complex chemical composition that can contain several phases, not only for fabrication of high performance Li-ion batteries, but also for many other applications.

Successive stacking of thin dense inorganic films in batteries can significantly increase the performance of Li-ion batteries.

Different vacuum deposition techniques have been used for fabrication of dense thin films in batteries. In particular, CVD (Chemical Vapor Deposition) deposits are used for the fabrication of thin films in the field of electronics. This technique and all its variants (EVD, OMCVD) can give high quality and strongly bonding films but the deposition rate is low, of the order of 1 to 10 μm/h, and reaction processes may require high temperatures, possibly more than 600° C., that cannot be resisted by all types of substrate. Moreover, these techniques often impose the use of highly corrosive gases.

Physical vapor deposition techniques also have disadvantages. "Thermal spray technology" techniques are suitable particularly for the fabrication of relatively thick deposits a few hundred microns thick, there are not very precise and they cannot be used to obtain perfectly homogeneous and controlled thin films. PVD (Physical Vapor Deposition) techniques cover several variants depending on the spraying mode. Compounds to be deposited may be vaporized by RF (radio frequency) excitation or may be ion beam assisted (IBAD). The deposition rate obtained with such technologies is of the order of 0.1 μm to 1 μm per hour. PVD deposition techniques can result in very good quality deposits containing almost no isolated defects, and can be used to make deposits at relative low temperatures. However, due to the difference in the evaporation rate between the different elements, it is difficult to deposit complex alloys with such techniques and to control the stoichiometry of the deposit. This technique is perfectly suitable for making thin films, but as soon as an attempt is made to increase the thickness of the deposit (for example thicknesses of more than 5 μm), columnar growth occurs and the deposition time becomes too long to envisage industrial use in the field of thin film microbatteries.

PVD deposition is the most frequently used technique for fabrication of thin film microbatteries. These applications require films with no porosity and no other isolated defects to guarantee low electrical resistivity and good ionic conduction necessary for these devices to work correctly.

However, vacuum deposition techniques used to make such films are very expensive and difficult to implement industrially over large areas with high productivity.

Other technologies currently available for making thin films include embodiments based on consolidation of compact particle deposits. These techniques include the production of deposits by sol-gel processes. This technique consists of depositing a polymeric lattice on the surface of a substrate obtained after hydrolysis, polymerization and condensation steps. The sol-gel transition appears during evaporation of the solvent that accelerates rectional processes on the surface. This technique can be used to make compact and very thin deposits. The films thus obtained are of the order of a hundred nanometers thick. Successive steps should be performed to increase the thickness of the deposit without inducing risks of cracks or crazing occurring. Consequently, this technique creates industrial productivity problems as soon as an attempt is made to increase the thickness of the deposit.

The inking techniques described above can be used to make thin deposits. However, a fluid ink is essential if deposits between 1 and 5 micrometers thick are to be obtained. The fluidity of inks depends on the content of dry extracts, particle sizes and the nature of the solvent and any organic compounds dissolved in this ink. In order to make thin film deposits, the dry extract has to be reduced and excessively small particle sizes are impossible (sizes larger than about a hundred nanometers). On the other hand, this increase in the solvent quantity increases risks of forming cracks, cavities and clusters in the deposit during the drying phases. The deposits then become very difficult to compact. Final compaction of the deposit is obtained by evaporation of the solvent contained in the ink. This drying step is difficult to control because regions with lower densities and locally lower porosity will dry faster than areas with higher densities. Capillary effects induced by these local differences in drying will cause zones with higher densities that are still impregnated to group together. The only way to consolidate these deposits is compaction under very high pressures (with the required pressure increasing as the particle size reduces) and/or sintering at high temperatures close to the melting temperature of the material forming the particles.

Very high temperatures are necessary to consolidate the initially porous structure. Temperature rises are difficult to control if it is required that shrinkage accompanying infilling of these pores in the thickness of the deposit does not lead to cracks. Furthermore, not all substrates resist such temperatures, and also the thickness of the deposit cannot be precisely controlled using the current liquid phase deposition techniques disclosed above.

Finally, there is another alternative for deposition of materials in thin films in electrochemical devices and particularly in batteries. This is an electrophoretic particle deposition. For example, patent application U.S. Pat. No. 7,662,265 (Massachusetts Institute of Technology) discloses the fabrication of thin film electrochemical devices (including batteries) by electrophoresis in which one of the electrodes (anode or cathode) and the solid electrolyte are obtained simultaneously, the other electrode having already been formed by electrophoretic deposition. Many cathode materials are mentioned, particularly $LiCoO_2$, and $LiFePO_4$, and the solid electrolytes mentioned are polymer electrolytes.

U.S. Pat. No. 6,887,361 (University of California) discloses a process to form a ceramic porous membrane on an electrochemical device substrate in the solid state. Deposition is made by electrophoresis of a suspension of ceramic particles in isopropylic alcohol followed by drying and sintering. The process is applicable essentially to solid oxide fuel cells (SOFC).

Patent applications US 2007/184345, WO 2007/061928, US 2008/286651 and WO 2010/011569 (Infinite Power Solutions) disclose electrochemical devices comprising a cathode deposited by techniques other than vacuum deposition; in particular they disclose deposition of a cathode film by electrophoresis from a micronic sized powder of $LiCoO_2$; however, this film comprises cavities and it must be consolidated by sintering at high temperature close to the melting temperature of the deposited material. Other parts of the battery are obtained by vacuum deposition.

U.S. Pat. No. 7,790,967 (3G Solar Ltd) also discloses the deposition of a nanoporous electrode made of $TiO_2$ by electrophoresis starting from a suspension of $TiO_2$ nanoparticles. The electrode thickness is of the order of 10 μm.

Some documents describe the use of electrophoresis for making some parts of thin film batteries; electrophoresis as described in these documents leads to porous films.

Patent JP 4501247 (DENSO) discloses a process for fabrication of an electrode for a battery in which a film of an active material is formed by electrophoresis. More specifically, this patent discloses a process in which a charge collector is dipped in a solution comprising an active material in a solvent, this process being part of a more general process for fabrication of an electrode for a battery. Electrophoresis of said active material contained in the solution is done by generating an electric potential gradient in this solution, the active material forming a film of active material on the surface of the collector and bonding to said collector surface. Fabrication of cathodes for Li-ion batteries using this process is mentioned. Techniques used to make the anode and the electrolyte are not mentioned.

Patent application JP 2002-042792 (DENSO) discloses a process for depositing a solid electrolyte on an electrode of a battery, the deposit being made by electrophoresis; no consolidation is done after the deposition. The electrolytes considered are essentially polymer electrolytes and lithium iodide.

Purposes of the Invention

A first purpose of this invention is the fabrication of all-solid-state thin film batteries with films that have excellent geometric precision, particularly precisely-controlled thickness and a very small number of defects, using a process providing a high deposition rate with low investment and operating costs.

Another purpose of the invention is to fabricate thin film batteries using a process that is easily implemented industrially and that causes little pollution.

Another purpose of the invention is to disclose a very simple process for making thin films with various chemical compositions.

Another purpose is to fabricate batteries with a better power density and a better energy density.

Yet, another purpose is to fabricate longer life batteries that can resist exposure to high temperatures without deteriorating.

These objectives are achieved using a process for fabrication of all-solid-state thin film batteries, said batteries comprising a film of anode materials (anode film), a film of solid electrolyte materials (electrolyte film) and a film of cathode materials (cathode film), each of these three films being deposited by an electrophoresis process, knowing that the anode film and the cathode film are each deposited on a conducting substrate, preferably a thin metal sheet or band or a metalized plastic sheet or band or a metalized insulating film, at least one of said conducting substrates being useable as a battery current collector, and the film of solid electrolyte material is deposited on the anode and/or cathode film, and knowing that said process also comprises at least one step in which said sheets or bands are stacked so as to form at least one battery with a "collector/anode/electrolyte/cathode/collector" type of stacked structure. Advantageously, this process also comprises at least one so-called consolidation step to increase the density of at least one of the films deposited by electrophoresis, this at least one consolidation step possibly being done on the conducting substrate with at least one anode film or at least one cathode film, said at least one anode film or cathode film possibly being coated with at least one electrolyte film, and said at least one consolidation step possibly being done before stacking and/or on the stacked structure, said at least one consolidation step comprising a mechanical compaction step and/or an annealing step at a temperature $T_R$ that preferably does not exceed 0.7 times the melting or decomposition temperature (expressed in ° C.) and preferably does not exceed 0.5 times (and even more preferably does not exceed 0.3 times) the melting or decomposition temperature of the anode, cathode or electrolyte material with the lowest melting temperature on which said annealing step is carried out.

More particularly, these objectives are achieved by the use of a fabrication process for an all-solid-state thin film battery comprising steps of:

(a) Providing a first colloidal suspension "SP+" containing "P+" particles, called a "cathode materials" suspension;

(b) Providing a second colloidal suspension "SP−" containing "P−" particles, called an "anode materials" suspension;

(c) Providing a third colloidal suspension "SPn" containing "Pn" particles, called a conducting "solid electrolyte materials" suspension;

(d) Providing conducting substrates, preferably in the form of a band or sheet;

(e) Immersing a first conducting substrate in a bath of said SP+ suspension containing cathode materials in the presence of a counter-electrode, followed by application of an electrical voltage between said first conducting substrate and said counter electrode so as to obtain an electrophoretic deposit containing P+ particles of cathode materials on said first substrate of conducting material;

(f) Immersing a second conducting substrate in a bath of said SP− suspension containing anode materials in the presence of a counter electrode, followed by application of an electric voltage between said second substrate and said counter electrode so as to obtain an electrophoretic deposit containing P— particles of anode materials on said substrate of conducting material;

(g) Immersing the first substrate coated in step (e) and/or the second substrate coated in step (f) in a bath of said SPn suspension of Pn particles of solid electrolyte materials in the presence of a counter electrode, followed by application of an electric voltage between said first and/or second coated substrate and the counter electrode so as to obtain an electrophoretic deposit of inorganic solid electrolyte material particles on said substrate(s);

(h) Assembling (stacking) cathode and anode substrates to obtain a battery.

Advantageously, said P+ and/or P− and/or Pn particles are nanoparticles.

The order of steps (a), (b), (c) and (d) is not important in this process; similarly, the order of steps (e) and (f) is not important. The substrate can be cut before step (g).

Another purpose of this invention is to make electrophoretic deposits on substrates that cannot resist very high temperatures.

This purpose is achieved using the process in which step (h) comprises a mechanical consolidation and/or low temperature ($T_R$) sintering step done one after the other or simultaneously, or in which step (h) is followed by such a step. The temperature $T_R$ advantageously does not exceed 600° C. In some embodiments, it does not exceed 400° C.

The so-called consolidation step is aimed at increasing the density of at least one of the films deposited by electrophoresis, this step possibly being done on the conducting substrate with at least one anode film or at least one cathode film, said at least one anode or cathode film possibly being coated with at least one electrolyte film before stacking and/or on the stacked structure.

Said consolidation step comprises at least one mechanical compaction step and/or a heat treatment (annealing) step at a temperature $T_R$ that preferably does not exceed 0.7 times the melting or decomposition temperature (expressed in ° C.), and preferably does not exceed 0.5 times (and even more preferably does not exceed 0.3 times) the melting or decomposition temperature (expressed in ° C.) of the anode, cathode or electrode material with the lowest melting temperature on which this annealing is done. The "melting temperature" term in this case refers to the decomposition temperature for the case of substances for which there is no melting point. In any case, it is preferable not to exceed a temperature $T_R$ of 600° C., and in some embodiments not to exceed 400° C. When the two steps (mechanical and heat treatment) are done, the heat treatment may be done before or after compaction or the two steps may be done simultaneously.

At least one and preferably all of the films deposited by electrophoresis are consolidated. This consolidation can be done on each substrate before and/or after the deposition of the electrolyte and/or after the assembly or stacking step. Very advantageously, a consolidation step is done after the assembly or stacking step in order to obtain good bonding between the electrolyte films (in the case in which an electrolyte is deposited on each electrode) or between the electrode film and the electrolyte that is deposited on said electrode film.

Consolidation is possible using a mechanical process, for example by passing between two rollers, or by pressing (preferably isostatic) or by shock, or by heat treatment, or by a combination of these processes. Thermal consolidation may be preceded, followed or accompanied by one or several mechanical consolidation steps.

In one particular embodiment, consolidation and particularly heat treatment is done under a vacuum or under an inert atmosphere.

Deposition by electrophoresis is preferably done with a colloidal suspension of particles smaller than 1 μm, preferably smaller than 100 nm, or even smaller than 30 nm. The use of nanoparticles, preferably smaller than 100 nm and even more preferably less than 30 nm, can give high density after consolidation. This density advantageously reaches 85%, and preferably 90%, and even more preferably 95% of the theoretical density of the solid substance.

Advantageously, the porosity of at least one of the films after consolidation is less than 15%, preferably less than 10% and even more preferably less than 5%.

In the process according to the invention, the average size $D_{50}$ of nanoparticles in the anode, cathode and/or solid electrolyte material is preferably less than 1 μm, more preferably less than 100 nm, and even more preferably the nanoparticles are smaller than 50 nm and even better smaller than 30 nm. This makes it possible to consolidate thin films thermally at a lower temperature. This is why approximately spherical or cubic-shaped particles are preferred.

The average grain size in at least one of the anode, cathode and/or electrolyte films after thermal consolidation is less than 1 μm; this increases the life of the battery, probably because the local unbalance of the battery reduces. The heat treatment duration should be appropriate to prevent the risk of excessive ("parasitic") growth of some grains.

Another purpose of the invention is to obtain highly compact films after the deposition by electrophoresis, free particularly of cavities, cracks and clusters in order to facilitate consolidation at low temperature.

In some embodiments, the zeta potential of the SP+, SP− and/or SPn colloidal suspensions provided in steps (a), (b) and (c) is greater than 40 mV, and even more preferably greater than 60 mV, to obtain stable suspensions not containing any particle clusters that could lead to defects in the deposited films. These suspensions can contain a steric or preferably electrostatic stabilizer. However, it is preferable that suspensions should not contain any stabilizer. Dry extracts from suspensions without stable stabilizers are advantageously between 2 and 20 g/L, the particle size preferably being smaller than 100 nm and even more preferably smaller than 50 nm. In this case, the Zeta potential of the suspension is usually less than 40 mV, and more particularly is between 25 and 40 mV.

The electrophoretic deposition of nanoparticles can be facilitated by means of a step to deposit a compound designed to reduce the Zeta potential on conducting bands prior to the particle deposition step, before the deposition of the P+, P− and or Pn particles.

Another purpose of the invention is the deposition of thin films with a very wide variety of chemical compositions that can associate several phases in order to increase functions of the deposits. This purpose is achieved through the use of the electrophoresis technique that makes it easy to deposit films using suspensions of particle mixes.

Another purpose of the invention is to be able to very precisely control deposited thicknesses (within a thickness range varying from a few hundred nanometers to a few tens or even about a hundred micrometers). More precisely, it is required to have a process that guarantees perfect uniformity of the thickness over the entire surface of the deposit, even on rough or non-flat substrates, and excellent reproducibility and repeatability at industrial scale. It is also required to use a technique allowing a continuous and constant deposit on the edge of the substrates.

In one advantageous embodiment, the thickness of the anode and/or cathode film after consolidation is less than 10 μm and is preferably less than 5 μm. The thickness of the electrolyte film after consolidation is advantageously less than 5 μm, preferably less than 2 μm and even more preferably less than 1 μm.

Yet another purpose is to achieve optimum economy of the raw material.

These objectives are achieved through the use of electrophoresis and precise control of the deposition current throughout the deposition, knowing that deposition by electrophoresis will only occur on a sufficiently conducting substrate.

Another purpose of the invention is an all-solid-state thin film battery capable of being fabricated by the process according to the invention; its energy density is preferably more than 250 Wh/kg and/or more than 500 Wh/liter.

Yet another purpose is a thin film battery composed of several "collector/anode/electrolyte/cathode/collector" elements stacked in the form of a rigid single-piece structure not containing any lithium salt as electrolyte.

Yet another purpose is a battery that can be obtained by the process according to the invention, also comprising at least one coating film containing metal elements, namely a termination film deposited on the edges of the electrodes, and an insulating protective film covering the other faces of the battery, such that said insulating protective film(s) and said at least one metal coating film form a hermetically sealed protection of the battery against ambient air.

DESCRIPTION OF THE FIGURES

FIG. 1(a) diagrammatically shows a compact deposition of particles 2 on a substrate 1. All particles 2 are in contact with their adjacent particles 2a, 2b, 2c, 2d. Pores 3 are located between particles 2. The stack shown in this figure (and in FIGS. 1(b), 1(c) and 1(d)) is deliberately less dense than a compact hexagonal stack, so that pores 3 between particles 2 are more easily visible.

FIG. 1(e) shows a dense deposit 4 as can be obtained using PVD type techniques; the porosity of these dense deposits is close to 0% because they are not formed by stacking particles.

FIGS. 3 to 25 show embodiments of the invention.

FIGS. 3(a), 3(b), 3(c) and 3(d) and FIG. 4 show products obtained with four steps in a particular embodiment of the process according to the invention.

FIGS. 8, 9, 10 and 11 show different types of batteries obtained at the end of the process according to the invention.

FIGS. 12 and 13 each show one process for making cutouts on an electrode band.

FIGS. 16a, 16b, 16c, 16d show products obtained at different steps in another particular embodiment of the process according to the invention, in which the substrate on which the electrodes are deposited is a polymer plate comprising metalized zones.

Figure 22:
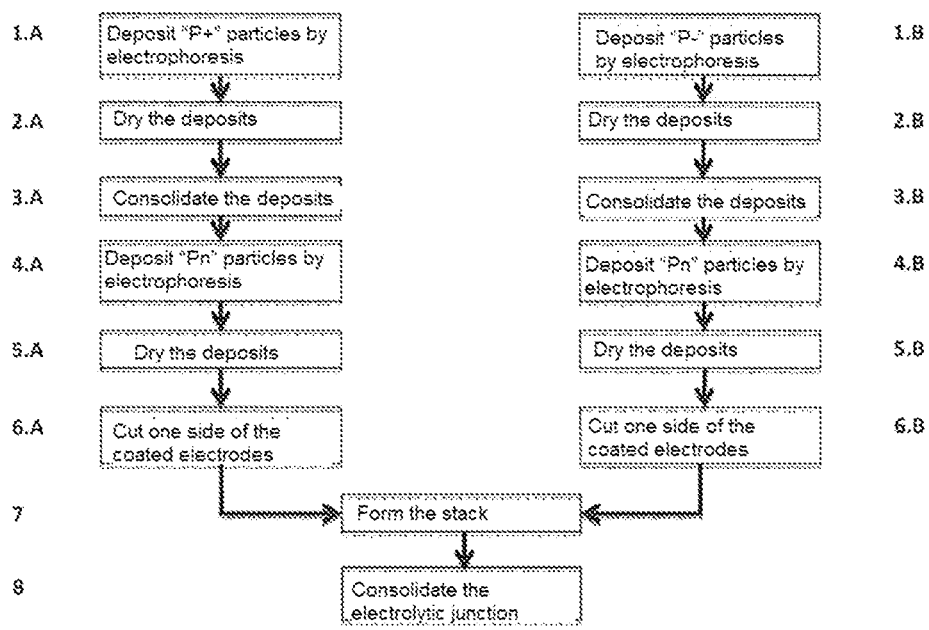

The diagrams in FIGS. 17 and 22 show typical embodiments of the process according to the invention.

Figure 18A:
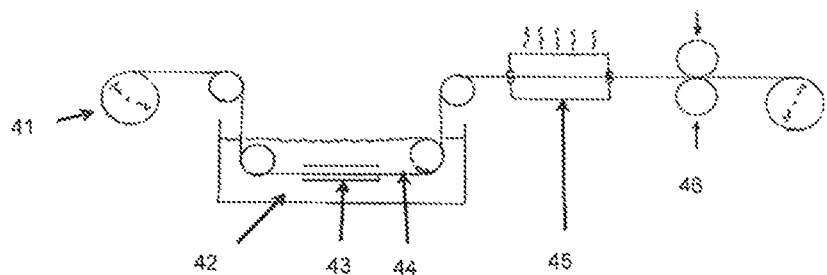
Figure 18B:
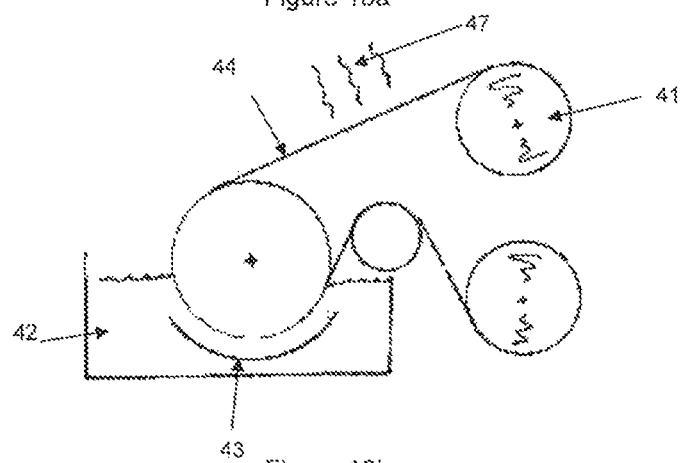

FIGS. 18a and 18b diagrammatically show devices for implementation of the process according to the invention.

Figure 19:
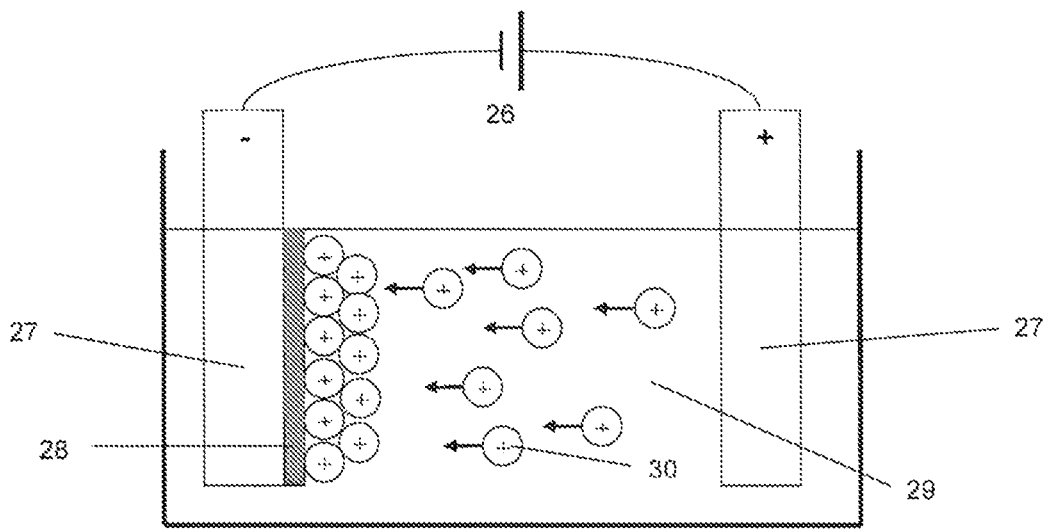

FIG. 19 shows the principle for making a deposition by electrophoresis.

Figure 20:
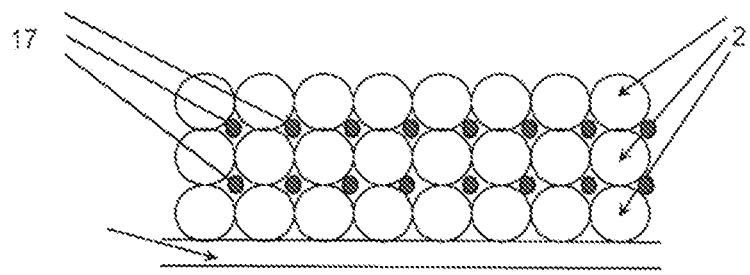

FIG. 20 is a diagrammatic representation of a deposition of two different sizes of nanoparticles.

Figure 21B:
Figure 21D:
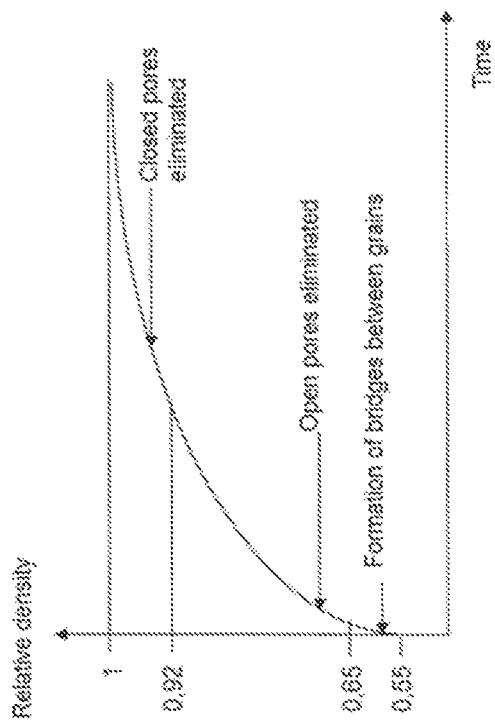
Figure 21A:
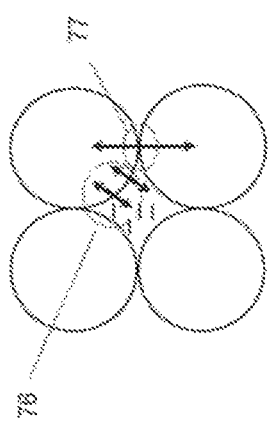
Figure 21C:
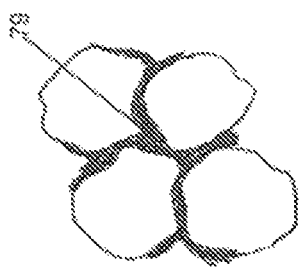

FIGS. 21a, 21b, 21c show lithium diffusion paths in different particle assembly configurations.

FIG. 21d shows the variation of porosity as a function of the density of the deposit.

FIG. 22 shows the steps in one embodiment of the process according to the invention.

FIG. 23a is a voltammetry curve for a suspension of $Li_4Ti_5O_{12}$ particles with a dry extract of 10 g/L. FIG. 23b is a voltammetry curve for a suspension of $Li_4Ti_5O_{12}$ particles with a dry extract of 2 g/L and a few ppm of citric acid.

FIG. 24 is a DLS diagram showing the distribution of the size of $(Li_{1.3}Al_{0.3}Ti_{1.7}(PO_4)_3)$ electrolyte particles in suspension.

Figure 11:
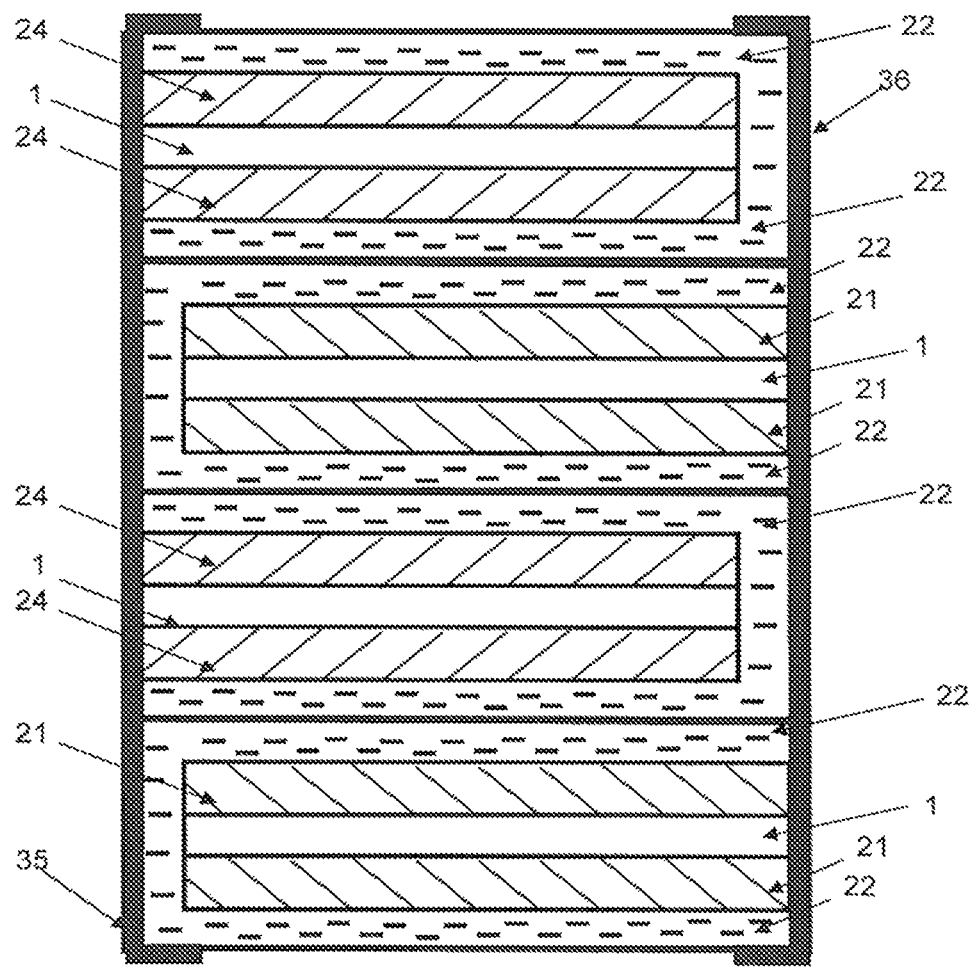
Figure 25:
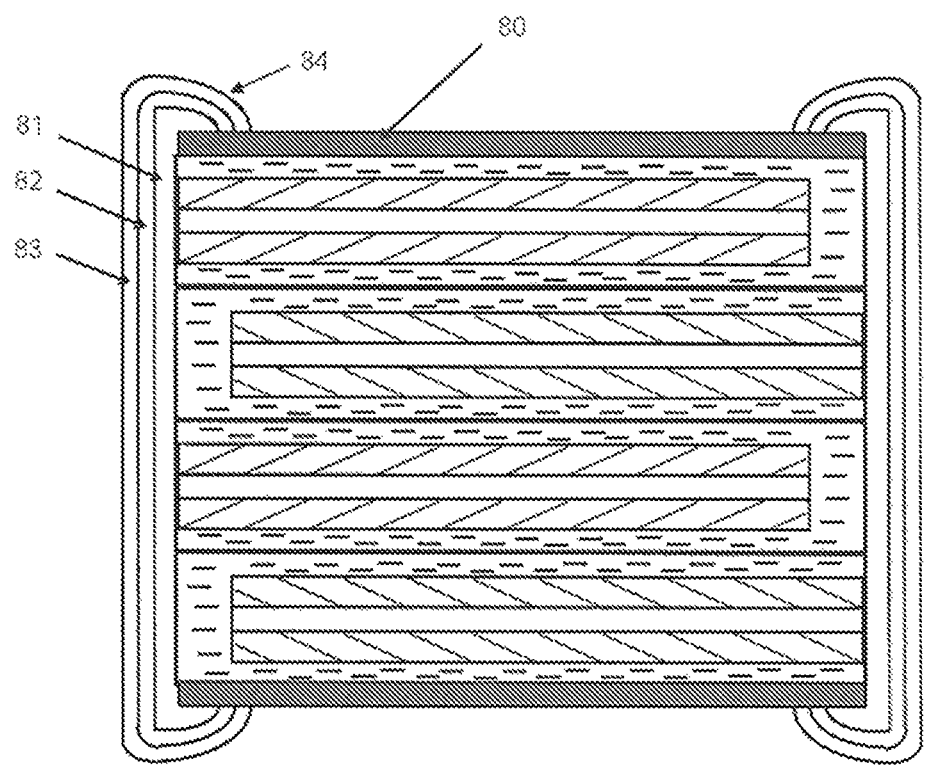

FIG. 25 shows a battery like that in FIG. 11, also comprising coatings for protection against atmospheric gases.

LIST OF REFERENCES

| | |
|---|---|
| 1 | Substrate |
| 2, 2a, 2b, 2c, 2d | Particles |
| 3 | Pore |
| 4 | Film obtained by PVD deposition |
| 5 | Agglomerate |
| 6 | Cavity |
| 7 | Open crack |
| 8 | Non-open crack |
| 9 | Stencil |
| 10 | Battery according to the state of the art |
| 11 | Separator |
| 12 | Cathode |
| 13 | Cathode current collector |
| 14 | Anode |
| 15 | Anode current collector |
| 16 | Defects |
| 17 | Particles smaller than particles 2 |
| 20 | Substrate |
| 21 | Anode |
| 22, 22', 22" | Electrolyte |
| 23, 23', 23" | Cut edge |
| 24 | Cathode |
| 25 | Connection between two electrolyte films |
| 26 | Electrical power supply, voltage source |
| 27 | Substrate and counter electrode |
| 28 | Deposit |
| 29 | Colloidal suspension |
| 30 | Particles |
| 35, 36 | Electrical contacts, termination |
| 41 | Unwinder |
| 42 | Colloidal suspension |
| 43 | Counter electrode |
| 44 | Substrate (foil) |
| 45 | Drying oven |
| 46 | Mechanical compaction device |
| 47 | Drying the substrate coated with film deposited by electrophoresis |
| 50 | Substrate edge |
| 60 | Metal film coated with photosensitive resin |
| 61, 61a, 61b | Polymer film |

| | -continued |
|---|---|
| 62 | Metal film of substrate 60 |
| 63 | Cathode film |
| 64a, 64b | Stencil |
| 65 | Insulating substrate |
| 66 | Electrolyte film |
| 67 | Anode film |
| 68a, 68b | Metal films on insulating substrate 65 |
| 71 | Cathode band |
| 72 | Anode band |
| 73 | Notch |
| 74 | Anode plate |
| 75 | Cathode plate |
| 76 | Surface contact zone between particles and the electrolyte contained in pores (low resistance diffusion path) |
| 77 | Point contact zone between particles (diffusion of lithium being limited on this point contact) |
| 78 | Welding of particles during consolidation that lead to the development of diffusion paths in the solid, for transport of electrical charges (electrons and ions) |
| 79 | Meltable phase that consolidated the particles to each other |
| 80 | Protective polymer film |
| 81, 82, 83 | Termination films |
| 84 | Overlap of the protective polymer film by termination films |

DETAILED DESCRIPTION OF THE INVENTION

For the purposes of this invention, "electrophoretic deposition" or "deposition by electrophoresis" refers to a film deposited by a process for deposition of electrically charged particles previously put into suspension in a liquid medium onto a surface of a conducting substrate, displacement of particles towards the surface of the substrate being generated by application of an electric field between two electrodes placed in the suspension, one of the electrodes forming the conducting substrate on which the deposit is made, the other electrode (counter electrode) being located in the liquid phase. A compact deposit of particles thus forms on the substrate if the zeta potential has an appropriate value as will be explained below.

In the context of this document, the particle size refers to its largest dimension. Thus, a "nanoparticle" is a particle for which at least one of its dimensions is smaller than 100 nm. The "particle size" or "average particle size" of a powder or a set of particles is given by $D_{50}$.

The "zeta potential" of a suspension is defined as being the difference in potential between the heart of the solution and the shear plane of the particle. It is representative of the stability of a suspension. The shear plane (or hydrodynamic radius) corresponds to an imaginary sphere around the particle in which the solvent moves with the particle when the particles move in the solution. The theoretical basis and the determination of the zeta potential are known to the electrochemist who develops depositions by electrophoresis; it can be deduced from the electrophoretic mobility. There are several marketed techniques and devices for making a direct measurement of the zeta potential. When the dry extract is small, the zeta potential can be measured using a Zetasizer Nano ZS type equipment made by the Malvern Company. This equipment uses optical devices to measure particle displacement speeds as a function of the electric field applied to them. The solution also has to be highly diluted to enable the passage of light. When the quantity of dry extract is large, the zeta potential can be measured using acoustophoresis techniques, for example using a device called "acoustosizer" made by the Colloidal Dynamics Company. The particle speed is then measured by acoustic techniques.

"Dispersant" refers to a compound capable of stabilizing the colloidal suspension and particularly preventing particles from agglomerating.

The process according to the invention comprises essential electrophoretic deposition steps of particles of cathode, anode and solid electrolyte materials. Such a process can significantly reduce the quantity of defects in films obtained in comparison with quantities obtained with known processes, particularly large pores, cavities, crazing and clusters; the quality of deposited films is better when the suspension from which the deposition is made is sufficiently stable.

The process according to the invention can be used to deposit thin films of electrodes and/or electrolyte. The thickness of these films is usually less than about 20 μm, preferably less than about 10 μm, and even more preferably less than 5 μm.

The process for fabrication of all-solid-state thin film batteries according to this invention has an advantageous alternative to known techniques and particularly to PVD deposition techniques, in that it can be used to make very dense depositions at low temperature on large substrate areas with high deposition rates, easily and very precisely controllable thicknesses (depending on the size of the particles) over a wide thickness range varying from a tenth of a micron to several tens or even hundreds of microns without requiring very expensive investment in complex and not very productive machines.

Figure 1:
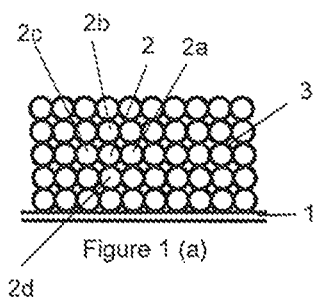
FIGS. 1(a), (b), (c) and (d) diagrammatically show films formed by stacking approximately isotropic shaped particles.
FIG. 1(e) shows a film deposited on a substrate using the PVD technique.
FIG. 1(b) diagrammatically shows a compact deposition of particles 2 as can be obtained using the process according to the invention.
FIG. 1(c) shows a deposit of particles 2 on a substrate, the deposit having defects. These defects are essentially cavities 6 related to the presence of clusters 5; therefore these cavities 6 form inter-cluster pores, unlike the intra-cluster pores 3 that are at a much smaller geometric scale. In the case of a deposition using the process according to the invention, these clusters 5 are formed when the suspension used is not sufficiently stable.
FIG. 1(d) shows a deposit of particles with cracks that appeared after drying; these cracks may be open (through) cracks 7 or internal (non-through) cracks 8.
Figure 1:
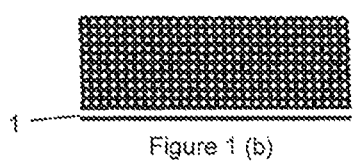
Figure 1:
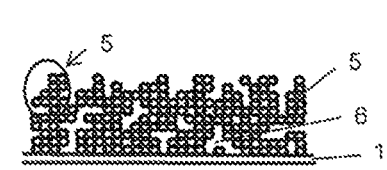
Figure 1:
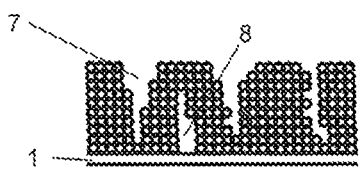
Figure 1:
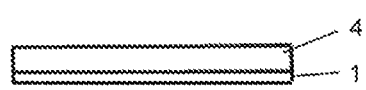
Figure 2:
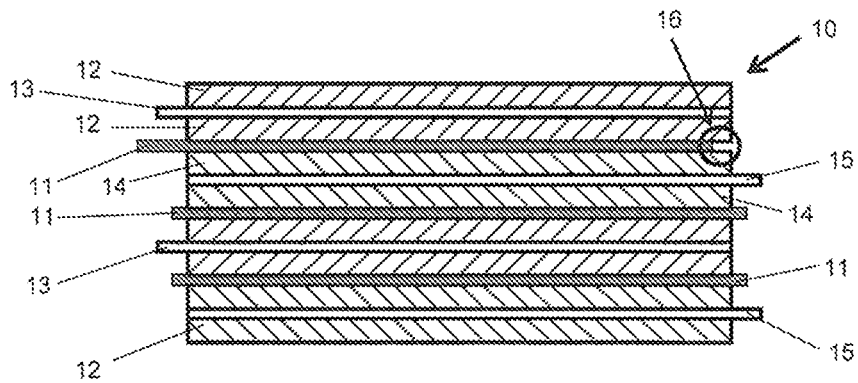
FIG. 2 diagrammatically shows a stack or winding 10 of battery electrodes between which a separator 11 is positioned in batteries according to the state of the art. More precisely, each cathode 12 and each anode 14 is connected to its cathode collector 13 and anode collector 15 respectively, and each cathode 12 is separated from its anode 14 by a separator 11 that performs the function of transporting lithium ions through its electrolyte impregnated pores, and providing electrical insulation between the electrodes. If the separator 11 is badly positioned between the electrodes 12 and 14 (for example following a positioning fault, vibration, shock during fabrication), then a short circuit (or a leakage current) can appear between the electrodes 12, 14 in the defect 16 on the edge of the electrodes.

FIGS. 1a to 1c show the differences between intra-agglomerate porosity 3 between particles 2 that will be referred to in this document as "pores", and inter-cluster porosity 6 between clusters 5 and will be referred to as "cavities" 6.

A compact deposit is a deposit without any cavities or cracks. On the other hand, it does have porosity in a ratio expressed as a percentage and calculated as follows:

Porosity [%]=[(density of the solid-state material−real density)/real density]×100 knowing that the "real density" is the density measured on the deposited film and the density of the solid-state material is the solid density of the deposited material, ignoring the presence of particles that create porosity when stacked.

The following describes each step in the process according to the invention.
Preparation of Suspensions Deposition is preferably done from very stable SP+, SP−, SPn colloidal suspensions so as to obtain a deposit with a perfectly uniform thickness with no roughness, few defects and as compact as possible after the electrophoretic deposition process. The stability of suspensions depends on the size of the P+, P−, Pn, particles and the nature of the solvent used and the stabilizer that was used to stabilize the colloidal suspension. Procurement of these colloidal suspensions corresponds to steps (a), (b) and (c) in a main embodiment of the process according to the invention.

"SP+" refers to a colloidal suspension of "P+" particles containing materials used to obtain a cathode film, "SP−" refers to a colloidal suspension containing P− particles of materials used to obtain an anode film, "SPn" refers to a colloidal suspension of "Pn" particles of materials used to obtain an electrolyte film.

Colloidal suspensions containing nanometric sized particles are preferred to facilitate subsequent consolidation of the deposit if necessary and to assure that thin film deposits can be made with very precise thicknesses and profiles (roughness). The average size $D_{50}$ of these particles is preferably less than 100 nm, and more preferably (especially in the case in which the suspension comprises particles of materials with high melting points) less than 30 nm. Consolidation of a deposit with small particles is much facilitated if the deposit is compact.

Making electrophoretic depositions from stable colloidal suspensions avoids the formation of pores, cavities and clusters that are prejudicial to consolidation of the deposit. Furthermore with this technique, it is possible to have deposits with excellent compactness without necessarily making use of mechanical pressing, regardless of the size of the deposited particles.

The stability of suspensions can be expressed by their zeta potential. In the context of this invention, the suspension is considered to be stable when its zeta potential is greater than 40 mV, and very stable when it is greater than 60 mV. On the other hand, particle clusters can develop when the zeta potential is less than 20 mV. Thus, in some embodiments, depositions are done from colloidal suspensions with a zeta potential of more than 40 mV, and even more preferably 60 mV (absolute value) to guarantee good compactness of the thin film. However, in other preferred embodiments of this invention, the suspensions have a small dry extract of particles and the zeta potential is less than 40 mV, as is described in more detail below.

Colloidal suspensions that will be used in electrophoresis comprise an electric insulating solvent that may be an organic solvent, or demineralized water, or a mix of solvents, and particles to be deposited.

In a stable suspension, the particles do not agglomerate with each other to create clusters that could induce cavities, clusters and/or important defects in the deposit. Particles remain isolated in the suspension.

Also in one embodiment of this invention, the stability of the suspension necessary to obtain a compact deposit is obtained through the addition of stabilizers. The stabilizer avoids flocculation of powders and the formation of clusters. It can act electrostatically or sterically. Electrostatic stabilization is based on electrostatic interactions between charges and is obtained by the distribution of charged species (ions) in the solution.

Electrostatic stabilization is controlled by the surface charge of particles; consequently, it may depend on the pH. Steric stabilization uses non-ionic surfactant polymers or even proteins which, when added to the suspension, are absorbed at the surface of particles to cause repulsion by congestion of the inter-particle space. A combination of the two stabilization mechanisms is also possible. Electrostatic stabilization is preferred for the purposes of this invention because it is easy to implement, reversible, inexpensive and facilitates subsequent consolidation processes.

However, the inventors have observed that with nanoparticles of the battery materials used for this invention, stable colloidal suspensions of particles that do not agglomerate among themselves and/or of clusters of a few particles can be obtained, without any addition of stabilizers. Particles and/or clusters are preferably smaller than 100 nm, and even more preferably smaller than 50 nm.

These suspensions were obtained for low quantities of dry extracts between 2 g/L and 20 g/L, preferably between 3 and 10 g/L, and more particularly for dry extracts of the order of 4 g/l, in alcohol and acetone. These stable colloidal suspensions of particles without added stabilizers are especially preferred for this invention.

The Zeta potential of such suspensions is usually less than 40 mV, and more particularly between 25 and 40 mV. This could mean that such suspensions tend to be instable, however the inventors have observed that the use of such suspensions for an electrophoretic deposition leads to very good quality deposited films.

With this type of suspension, the nanoparticles are negatively charged, therefore they are compatible with anaphoretic depositions. The addition of stabilizers or cations to the suspension to modify the surface charge of nanoparticles to make them compatible with cataphoretic polarizations could lead to deposits being polluted. Organic stabilizers with low volatility could electrically isolate the nanoparticles thus preventing any electrochemical response.

Deposition voltages of less than 5 V must be preferred when the solvent used is water. At above 5 V, water can be electrolyzed causing gas production on electrodes that make deposits porous and reduce their adherence onto the substrate. Galvanic reactions in an aqueous medium also cause the formation of metal cations that can pollute deposits.

In one preferred embodiment, depositions are made in a solvented phase. It is thus possible to work at much higher voltages, thus increasing deposition rates.

According to the invention, nanoparticles used for making the cathode thin film are preferably but not exhaustively chosen from among one or several of the following Mx materials:

(i) $LiMn_2O_4$, $LiCoO_2$, $LiNiO_2$, $LiMn_{1.5}Ni_{0.5}O_4$, $LiMn_{1.5}Ni_{0.5-x}X_xO_4$ oxides (where x is selected from among Al, Fe, Cr, Co, Rh, Nd, other rare earths and in which $0<x<0.1$), $LiFeO_2$, $LiMn_{1/3}Ni_{1/3}Co_{1/3}O_4$;

(ii) $LiFePO_4$, $LiMnPO_4$, $LiCoPO_4$, $LiNiPO_4$, $Li_3V_2(PO_4)_3$ phosphates;

(iii) all lithiated forms of the following chalcogenides: $V_2O_5$, $V_3O_8$, $TiS_2$, $TiO_yS_z$, $WO_yS_z$, $CuS$, $CuS_2$.

According to the invention, the nanoparticles used for making the anode thin film are preferably but not exhaustively chosen from among one or several of the following materials:

(i) tin oxinitrides (typical formula $SnO_xN_y$);

(ii) mixed silicon and tin oxinitrides (typical formula $Si_aSn_bO_yN_z$ where $a>0$, $b>0$, $a+b\leq 2$, $0<y\leq 4$. $0<z\leq 3$) (also called SiTON), and particularly $SiSn_{0.87}O_{1.2}N_{1.72}$; and oxinitrides in the form $Si_aSn_bC_cO_yN_z$ where $a>0$, $b>0$, $a+b\leq 2$, $0<c-10$, $0<y<24$. $0<z<17$; $Si_aSn_bC_cO_yN_zX_n$ and $Si_aSn_bO_yN_zX_n$ where Xn is at least one of the elements F, Cl, Br, I, S, Se, Te, P, As, Sb, Bi, Ge, Pb.

(iii) $Si_xN_y$ type nitrides (particularly in which x=3 and y=4), $Sn_xN_y$ (particularly in which x=3 and y=4), $Zn_xN_y$ (particularly in which x=3 and y=4), $Li_{3-x}M_xN$ (where M=Co, Ni, Cu);

(iv) $SnO_2$, $Li_4Ti_5O_{12}$, $SnB_{0.6}P_{0.4}O_{2.9}$. oxides

The anode or cathode can be made by adding nanoparticles of electron conducting materials to the materials mentioned above, and particularly graphite, and/or nanoparticles of lithium ion conducting materials of the type used to make electrolyte films. Some electrode materials are bad ion and electrical conductors, consequently when the deposited thicknesses are greater than 0.5 µm, the electrode may be too resistive and not function any longer. Thicknesses of 1 to 10 µm are usually required for electrodes, so as to have batteries with good energy densities. In this case a co-deposit of electrode material particles and conducting particles (ion and/or electrical) is required.

The electrolyte must be a good ion conductor but also an electrical insulator. According to the invention, the nanoparticles used to make the electrolyte thin film are preferably chosen from among one or several of the following Mx materials:

(i) lithium compounds based on lithium oxinitride and phosphorus (called LiPON) in the form $Li_xPO_yN_z$ where x ~2.8 and 2y+3z ~7.8 and $0.16 \leq z \leq 0.4$, and in particular $Li_{2.9}PO_{3.3}N_{0.46}$, but also all variants in the form $Li_wPO_xN_yS_z$ where 2x+3y+2z=5=w and $3.2 \leq x \leq 3.8$, $0.13 \leq y \leq 0.4$, $0 \leq z \leq 0.2$, $2.9 \leq w \leq 3.3$ or in the form $Li_tP_xAl_yO_uN_vS_w$ where 5x+3y=5, 2u+3v+2w=5+t, $2.9 \leq t \leq 3.3$, $0.94 \leq x \leq 0.84$, $0.094 \leq y \leq 0.26$, $3.2 \leq u \leq 3.8$, $0.13 \leq v \leq 0.46$, $0 \leq w \leq 0.2$;

(ii) lithium compounds based on lithium oxinitride, phosphorus and silicon (called LiSiPON), and particularly $Li_{1.9}Si_{0.28}P_{1.0}O_{1.1}N_{1.0}$;

(iii) lithium oxinitrides of the LiBON, LiBSO, LiSiPON, LiSON, thio-LiSiCON, LiPONB types (where B, P and S represent boron, phosphorus and sulfur respectively);

(iv) compounds $La_{0.51}Li_{0.34}Ti_{2.94}$, $Li_{3.4}V_{0.4}Ge_{0.6}O_4$, $Li_2O$—$Nb_2O_5$, $LiAlGaSPO_4$;

(v) formulations based on $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where 0<x<1), $Li_{1+x+y}Al_xTi_{2-x}Si_yP_{3-y}O_{12}$ (where $0 \leq x \leq 1$ and $0 \leq y \leq 1$), $Li_{1+x+z}M_x(Ge_{1-y}Ti_y)_{2-x}Si_zP_{3-z}O_{12}$ (where $0 \leq x \leq 0.8$; $0 \leq y \leq 1.0$; $0 \leq z \leq 0.6$), and in particularly formulations 4.9LiI-34,1$Li_2O$-61$B_2O_3$, 0,30$Li_2S$-0.26$B_2S_3$-0.44LiI, 60$Li_2S$-40$SiS_2$, 0.02$Li_3PO_4$-0.98($Li_2S$—$SiS_2$), 2($Li_{1.4}Ti_2Si_{0.4}P_{2.6}O_{12}$)—$AlPO_4$, 0.7$Li_2S$-0.3$P_2S_5$.

Once the required chemical composition (i.e. the nature of the powder or powder mixes) has been defined, the nanoparticles are put into solution in an appropriate liquid phase. A stabilizer is added in some embodiments, in order to obtain a suspension for which the zeta potential is preferably greater than 40 mV, and even more preferably more than 60 mV.

Advantageously, the suspensions used do not contain any stabilizers, and particularly the suspensions used have low dry extracts (usually less than 20 g/L and preferably less than 10 g/l), and especially they contain particles smaller than 100 nm and preferably smaller than 50 nm. In this case, the Zeta potential of the suspension is usually between 25 and 40 mV.

For example, the solvents used can be based on ketone, alcohol or a mix of the two.

Steric stabilizers that could be used include particularly polyethylene imine (PEI), polyacrylic acid (PAA), citric acid and nitrocellulose provided that they are soluble in the chosen organic solvent.

Electrostatic stabilizations may be made by adding iodide, by adding acids or bases. The solution may be acidified or basified by the addition of traces of water and acids when the suspension is made in a solvented phase.

The electrical conductivity of the suspension may be controlled to obtain a large potential gradient between the two electrodes without any risk of dielectric breakdown. Preferably, the conductivity of the colloidal suspension is between 1 and 20 µS/cm. Small quantities of acids and strong bases can be added to control the conductivity of the suspension and charge particle surfaces.

It may be necessary to perform a powder grinding and/or dispersion step before the nanoparticles are put into suspension, to de-agglomerate the particles and possibly adjust their size (to obtain an average size smaller than 100 nm or even less than 30 nm) and reduce the size dispersion, so as to obtain a stable suspension with cluster-free nanometric sized particles. Ultrasounds may also be used to assist in deagglomeration and putting particles into suspension.

Defects created in particles during the grinding and dispersion steps can also reduce the consolidation temperature, in the same way as when mechanical compressions are performed.

Deposition of Films

According to the invention, at least one and preferably all films in the battery (in other words the anode, the solid electrolyte and the cathode) are deposited electrophoretically (steps (e), (f) in one of the main embodiments of the process according to the invention) (see also FIG. 22, steps 1.A, 1.B, 4.1 and 4.B for another embodiment of the invention). The electrophoretic deposition of particles is made by application of an electric field between the substrate on which the deposit is made and the counter electrode, in order to move the charged particles in the colloidal suspension and to deposit them on the substrate. The lack of binders and other solvents deposited on the surface with the particles can result in very compact deposits. The compactness obtained due to electrophoretic deposit and the lack of any large quantities of organic compounds in the deposit can limit or even prevent risks of crazing or the appearance of other defects in the deposit during drying steps.

Furthermore, due to the fact that the deposit obtained by electrophoresis does not contain any binders or other organic compounds, the process according to the invention does not require any burning or evaporation steps of corrosive or noxious compounds. The increase in economic and environmental constraints makes it necessary to reduce releases into the atmosphere and this invention thus satisfies these constraints.

Furthermore, the deposition rate can be very high depending on the applied electrical field and the electrophoretic mobility of particles in suspension. For an applied voltage of 200 V, deposition rates of the order of 10 µm/min can be obtained.

FIG. 19 shows the operating principle of deposition by electrophoresis.

The inventor has observed that this technique can be used to make deposits on very large areas with excellent uniformity (provided that the particle concentrations and electric fields are uniform over the surface of the substrate). It is also suitable for a continuous band process, in other words the substrate is advantageously a band; the band is advantageously stationary relative to the liquid phase during the electrophoretic deposition.

The substrate can be a sheet or a band with a conducting surface or conducting elements, for example conducting zones; it is provided in step (d) in a main embodiment of the process according to the invention. For example, a copper or aluminum foil with a thickness for example of 6 µm or a polymer band with a an electrically conducting surface deposition, can be used.

Advantageously, the substrate is a thin aluminum sheet. Aluminum substrates are compatible with anaphoretic deposition processes, unlike some other metals and particularly copper that tends to dissolve in anodic polarization. This surface dissolution of copper bands prevents the creation of a stable bonding base for electrode deposits. The inventors have observed that with nanoparticles in battery materials, it is possible to obtain colloidal suspensions of monodispersed particles without the addition of stabilizers, but that these nanoparticles are always negatively charged and consequently compatible with anaphoretic depositions. These suspensions were obtained for small dry extracts of the order of 4 g/l in an alcohol type organic solvent (for example ethanol) and/or ketone (for example acetone).

The substrate may be prepared for example as follows; an aluminum foil between 5 and 20 µm thick is provided, preferably of the order of 15 µm thick. The foil is then positioned to be held "flat". The surface of the aluminum foil is preferably cleaned, for example by immersion in a cleaning bath. This cleaning may for example be done by immersions in a bath of detergent made by NGL technologie under ultrasounds followed by rinsing with distilled water.

The foil is electro-polished to reduce its thickness and/or to eliminate surface roughnesses and/or micro-roughnesses. This electro-polishing treatment can be done in a solution with a chemical composition equal to 80% absolute ethanol, 13.8% distilled water, 6.2% perchloric acid at 70%. The applied voltage is of the order of 15V. The treatment bath can be cooled if necessary to prevent overheating due to high current densities.

Other bath formulations may be used for a better surface quality, for example baths based on EPS 1250 or EPS 1300 type solutions made by EP-Systems.

After the electro-polishing treatment, the surface is rinsed with distilled water. The foil thickness after this treatment is usually between 1 and 10 µm.

This foil is advantageously used as anode substrate and cathode substrate in the process according to the invention.

Optionally, a nickel-plating treatment can be made directly on the foil surface just after its electro-polishing treatment. This treatment may be done in different ways, either by electrochemical deposition or by immersion in a solution containing nickel salts, or both one after the other. For example, the electrolytic deposit may be made in a bath with the following composition: nickel sulfamate at 300 g/l, $H_3BO_3$ at 30 g/l, and $NiCl_2$ at 30 g/l. Nickel-plating is done on the aluminum foil, the surface of which was previously activated by electro-polishing at a current density of the order of 2 $A/dm^2$, using a nickel counter electrode. This nickel-plating treatment prevents the formation of an oxide film on the aluminum surface, and improves the quality of electrical contacts and the adherence of deposits.

The thickness of each cathode and anode film is preferably between 2 µm and 10 µm. The thickness of the electrolyte film is preferably less than 2 µm.

A mechanical consolidation step (for example by pressing) can be carried out after deposition of the film and before the heat treatment sintering step if there is one, in order to further compact particles and induce particle deformations that will further simplify subsequent consolidation.

However in other embodiments, the heat treatment is preferably carried out before the mechanical consolidation step.

Deposition by electrophoresis may be applied in a "batch" (static) type process or in a continuous process. FIGS. 18a and 18b show different methods of making electrophoretic depositions, to make thin bands or coatings on a conducting substrate.

During the electrophoretic deposition, a stabilized power supply can be used to apply a voltage between the conducting substrate and the two electrodes located on each side of this substrate. This voltage may be direct or alternating. Precise monitoring of the currents obtained helps to monitor the deposited thicknesses and to control them precisely. When the deposited films are insulating, their thickness affects the value of the electrical field and in this case, a controlled current deposition mode is preferred. The value of the electrical field is modified depending on the resistivity of the interface.

FIG. 18a diagrammatically shows an installation to make use of the process according to the invention. The electrical power supply located between the counter electrodes 43 and the conducting substrate 44 is not shown. An electric field is applied between the two counter electrodes 43 and the substrate 44 to deposit particles of the colloidal suspension 42 on the two faces of the substrate 44.

The reel of electrically conducting foil (band) 44 used as a substrate is unwound from an unwinder 41. After the deposition, the deposited film is dried in a drying furnace 45 and is then consolidated by mechanical compaction using an appropriate compaction means 46. Compaction may be done under a controlled atmosphere and for temperatures between ambient temperature and the melting temperature of the deposited materials.

The view in FIG. 18a is interesting for manufacturing deposits of active materials on current collectors used to make battery electrodes. However, it may be sufficient to coat only one face of the substrate. FIG. 18b also shows a device to make a coating on a single conducting face without mechanical consolidation.

This deposition technique also enables perfect coverage of the surface regardless of its geometry and the presence of roughness defects. Consequently, it can guarantee dielectric properties of the deposit.

The lack of mechanical contact means that deposits can be made on extremely large areas. With known deposition techniques such as roll coat, doctor blade etc., it is difficult to guarantee a perfectly uniform thickness over large substrates, which is why the width of coating lines is often limited. For example, when it is required to make high power Li-ion battery deposits, in other words thin deposits, the maximum band width is about 200 to 300 mm, which strongly limits the production capacity of coating lines according to the state of the art.

When materials that do not conduct electricity or conduct electricity only slightly are deposited on the surface of a substrate, any zones that are not so well coated conduct better and thus locally concentrate a higher deposition rate that tends to compensate or even eliminate the defect. The intrinsic quality of the deposits obtained is thus excellent, there are very few defects and they are very homogeneous.

The diagram in FIG. 17 shows a typical embodiment of the process according to the invention:

Step 1: Preparation of suspensions. In a first step we use powders with the required chemical composition of the coating (thin film).

Step 2: Immersion of a metal substrate in the colloidal suspension. The colloidal suspension can cover the entire surface of the substrate. In one particular embodiment, a stencil can be applied to the surface of the substrate so as to limit the area in contact with the suspension, consequently reducing the area of the deposit.

Step 3: Application of an electric field between the substrate and the counter electrode located in the colloidal suspension. This electric field can be constant and/or variable (alternating). The average direction of the electric field, in other words the potential applied to the electrodes, is adapted to the charge of the particle to be deposited (cataphoresis or anaphoresis).

Step 4: Drying conditions depend on the deposited thickness and the nature of the solvent.

Step 5: consolidation of the deposit.

Consolidation of the Deposit

Advantageously, deposited films are consolidated to minimize cavities, pores, cracks and other compaction defects. This consolidation step of the deposit can be done:

- by a mechanical means, particularly by isostatic pressing. The applied pressure is preferably between 30 and 100 MPa; a value of the order of 50 MPa gives very good results. In other embodiments, the applied pressure is more than 250 MPa or even more than 400 MPa.
- by heat treatment. The temperature depends closely on the chemical composition of the deposited powders. Depending on the nature of the deposited materials, it may also be useful to maintain a controlled atmosphere to prevent oxidation of the coating;
- by a combination of thermal and mechanical means, and particularly by hot pressing.

The substrate of battery thin films is composed of a generally metal electrically conducting material. When the substrate is metallic, it is preferred to avoid heating it to high temperatures during fabrication of the battery, to prevent risk of oxidation and deterioration of surface properties. The reduction in surface oxidation is particularly beneficial to reduce electrical contact resistances, which is an essential point in operation of energy storage and/or production devices.

Very high quality electrophoretic films like those described above and particularly compact films, can reduce the heat treatment duration and temperature and limit shrinkage related to these treatments, to obtain a homogeneous nanocrystalline structure. This contributes to obtaining dense films with no defects.

The inventor has observed that the heat treatment temperature can be reduced if the size of the deposited particles is reduced. Thus, thin or relatively thick film deposits can be made with porosities of less than 5% or even 2% without needing to apply high temperatures and/or long heat treatment times. Furthermore, this compaction technology for low temperature deposits considerably reduces risks of shrinkage. Thus, it is no longer necessary to use highly complex and expensive heat treatment cycles to consolidate deposits of ceramics for battery electrode and electrolyte films.

During the mechanical and/or thermal consolidation phase, it can be advantageous to work under a vacuum or under an inert atmosphere to prevent the appearance of pollution on particle surfaces that could be harmful to the consolidation mechanism of particles among each other.

For particle sizes like those used in the process according to the invention, the increase in surface energies becomes the main driving force of consolidation by heat treatment; this results in a large reduction in consolidation temperatures when the particle size reduces. However, if this reduction in consolidation temperatures is to be effective, it might be necessary for particles to be firstly mechanically compacted and/or deposited with compact stacking. In this case, multiplication of mechanical contacts between these particles can facilitate diffusion processes that cause consolidation. Thus, pressing is usually applied to compact deposits. This pressing compaction technique (calendering) is well adapted to deposits composed of micronic or larger particles.

The presence of clusters and inter-cluster cavities also has an influence on consolidation. As cavity sizes increase, the diffusion distance also increases and the consolidation temperature necessary to obtain good consolidation increases.

Thus, with nanoparticles deposited by electrophoresis, it is possible to approach the theoretical geometric density of a compact stack of spheres (74%), without a mechanical compaction step.

Such a result is not possible using inking techniques. Deposition of nanoparticles using the ink technique mentioned above is very difficult with thin films because the reduction in particle size increases the viscosity of suspensions. Thus, the dry extract has to be reduced by increasing the proportion of solvent; in this case, pores and cavities are induced when much of the solvent is eliminated from the raw films, and it is practically impossible to fill them without the use of extreme temperatures and/or pressures.

The high compactness of the deposit obtained by electrophoresis and the small quantity of solvent to be evaporated very significantly reduce the risk of appearance of cracks after drying. Furthermore, the small size of particles and their large specific area tends to facilitate consolidation steps by heat treatment (often called "sintering" in this context). The deposit can be consolidated at temperatures not exceeding $0.7T_f$, or even $0.5T_f$ or $0.3T_f$ where $T_f$ is the melting or decomposition temperature (expressed in ° C.) of the solid material with chemical composition identical to that of the deposited particle. When several particles are co-deposited, the particles with the lowest melting temperature should be considered. Mechanical compression can also be applied to this deposit in order to further reduce this consolidation temperature, in order to further increase its compactness and/or create isolated defects that will contribute to accelerating the consolidation process and obtaining thin films with no pores.

Such a process for the fabrication of thin films can be used directly on substrates such as aluminum foil with low melting temperatures.

However, since nanoparticles are very sensitive to surface pollution, it is preferable to perform these consolidation treatments under a vacuum or under an inert atmosphere.

Figure 3A:
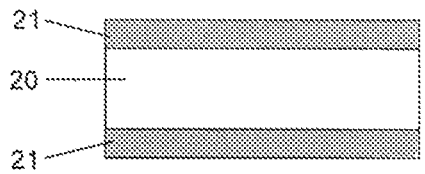
Figure 3B:
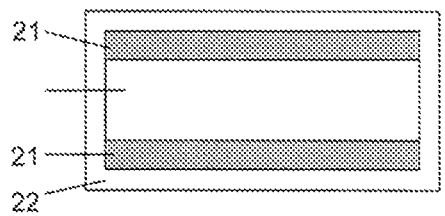

FIG. 22 diagrammatically shows the steps in fabrication of a battery according to the invention using one embodiment of the process according to the invention; the product obtained in each step is shown diagrammatically in FIGS. 3(a) to 3(d) and 4. In steps 1.A and 1.B, electrophoresis is used to deposit a cathode film 24 and an anode film 21 respectively, on the conducting substrate 20. As shown in FIG. 3(a) for the anode 21, this deposit may be made on the two faces of the conducting substrate. The film deposited by electrophoresis is dried in steps 2.A and 2.B. In steps 3.A and 3.B, it is consolidated by mechanical and/or thermal means. This mechanical consolidation can result in a density of more than 90% of the theoretical density of the solid body, or even more than 95%. Drying may be done before or after mechanical consolidation.

At this stage, it is important to remember that depositions with a very good initial compactness can be obtained using electrophoretic techniques. Thus the shrinkage of such a deposit during consolidation is small and therefore there are few or no defects in the films, even if they are made over large areas and thicknesses. Furthermore, this consolidation step will be done even more easily at low temperatures and during short times if the initial film is compact and particles are small. It is advantageous to use small particles (<30 nm) and/or with parallelepiped shapes in order to further increase compactness before sintering.

In steps 4.A and 4.B, the electrolyte film 22 is deposited on the anode 21 and on the cathode 24 respectively. The thickness of the film may be of the order of 1 μm. This deposit also covers the edges of the electrodes, as shown diagrammatically in FIG. 3(b) and also in FIG. 12b. This isolation of the edges of electrodes prevents the risk of short circuit and the risk of leakage currents. This electrolyte deposit is dried in steps 5.A and 5.B bis.

Figure 3C:
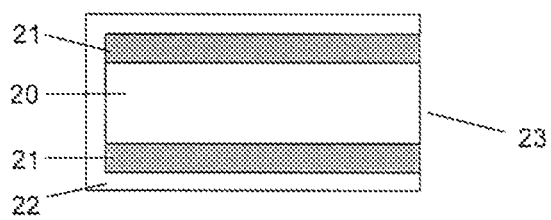
Figure 3D:
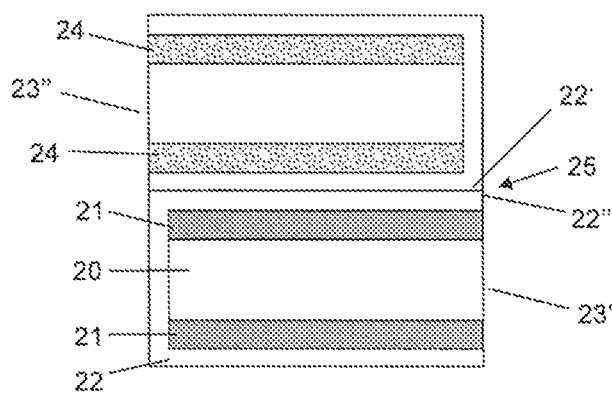
Figure 4:
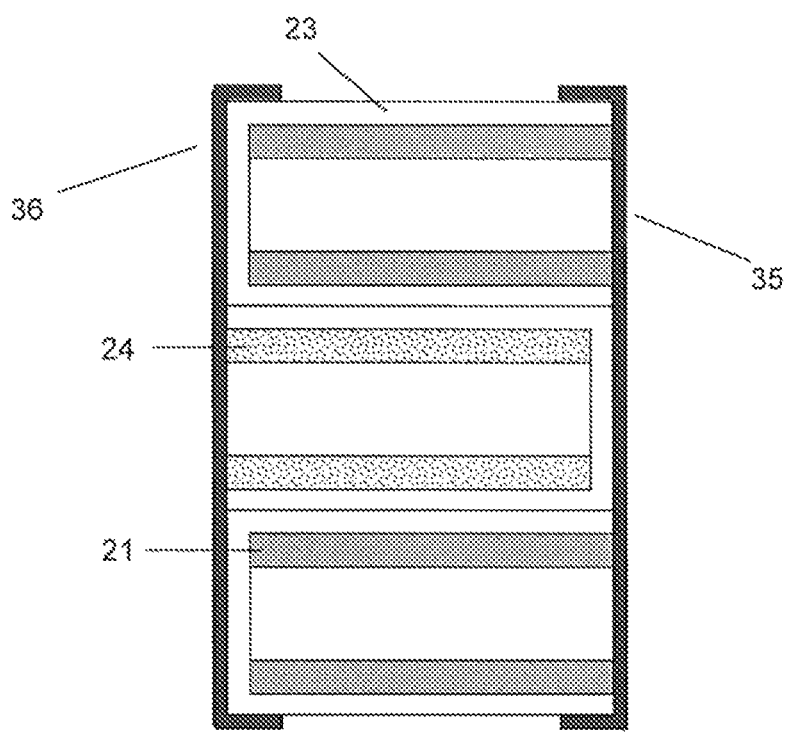
Figure 12:
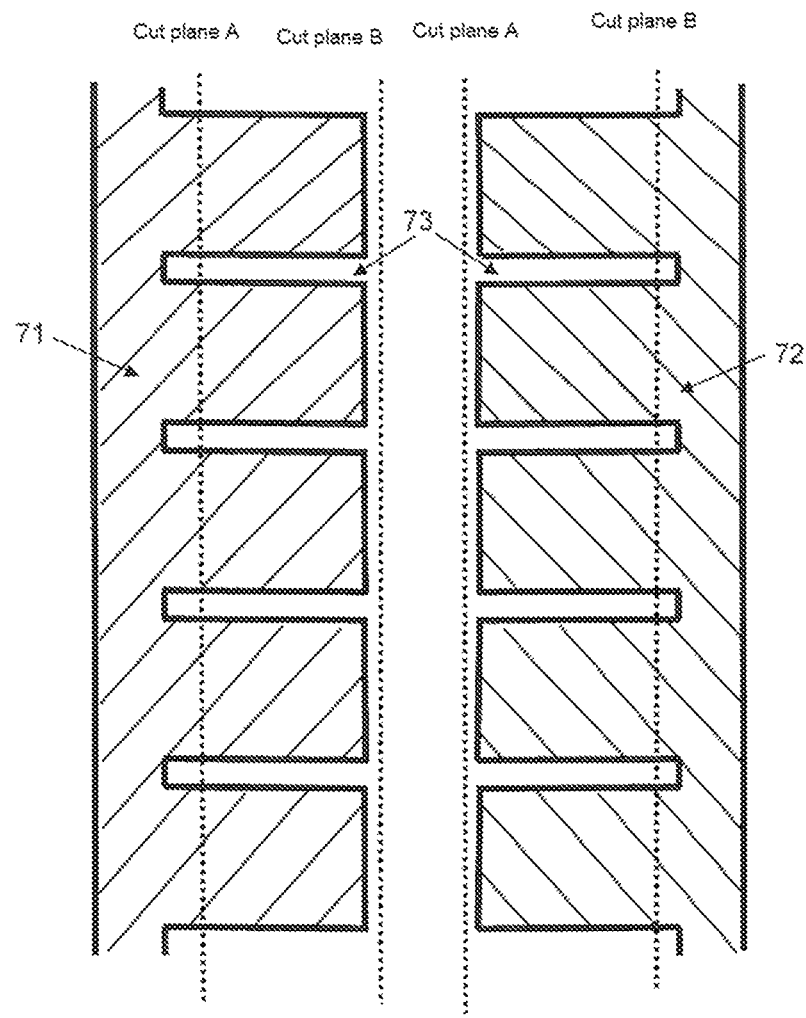

One edge of the electrodes is cut in steps 6.A and 6.B as shown in FIG. 12. Advantageously, the edge related to the band will be cut in order to leave three edges coated with electrolyte on the edge. Since this electrolyte is a dielectric, after the next stacking step, anodic contacts alone on one side of the cell and cathode contacts alone on the other side of the cell will be visible, so as to make parallel assemblies of the battery elements and create a higher capacity battery cell. FIG. 3(c) diagrammatically shows such a cell section after cutting; the substrate 20 has been coated (in this case on two faces) with a cathode film 21 and cut on an edge 23. In step 7, the stack is made such that there is a sequence of cut edges 23' of anode 21 and edges of cathode 24 coated with electrolyte 22, alternately on two opposite sides of the stack. FIG. 4 shows a stack of two substrates 20, one being coated with an anode film 21 on the two faces and the other with a cathode film 24, the two faces of the electrolyte film 22', 22" being deposited on each other to form a common interface 25. In step 8, this stack may be consolidated to obtain a good bond ("weld") between the two faces 22', 22" of the electrolyte film 22. If the melting temperature of the anode and cathode films is significantly higher than the melting temperature of the electrolyte film, it is preferable to perform thermal consolidation of the anode and cathode films separately before stacking, and then to do a thermal consolidation of the stack to consolidate the electrolyte film.

Once the stack is complete, the terminations (electrical contacts) 35, 36 are added at the level at which the cathode current and anode current collectors respectively are visible (not coated with insulating electrolyte). These contact zones may be on opposite sides of the stack to collect current as shown in FIG. 4, but they may also be on the same sides or on adjacent sides.

In one particular embodiment, the stack shown in FIG. 4 is made by winding two half-electrodes (one of which is shown in FIG. 3(c)) together on a mandrel to obtain a cylindrical-shaped cell. As for the configuration in FIG. 4, the anode connections then project from one side, while the cathode connections project from the other side.

All the following figures show only two cells in the stacks, but it is obvious that the number of stacked cells can be much higher.

Figure 5A:
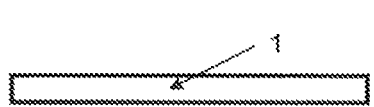
FIGS. 5a, 5a', 5b, 5b', 5c, 5c' show products obtained at different steps in a particular embodiment of the process according to the invention.
Figure 5A:
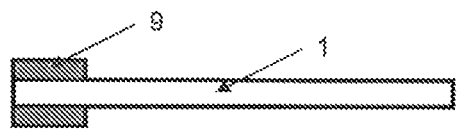
Figure 5B:
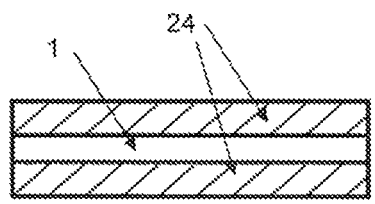
Figure 5B:
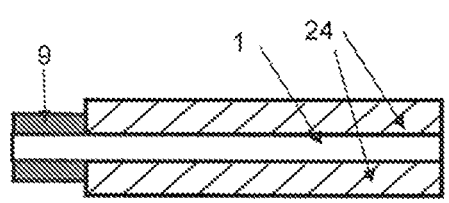
Figure 5C:
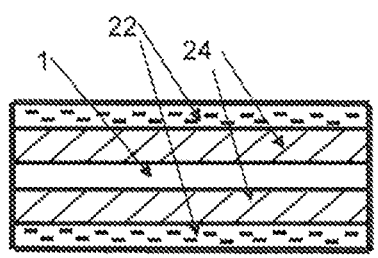
Figure 5C:
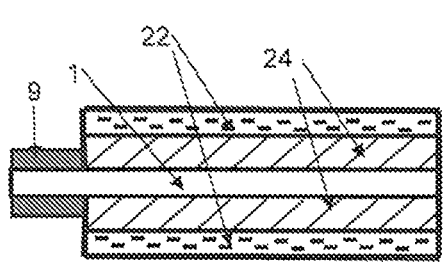

FIGS. 5a to 5c' show the different steps in an electrophoretic deposition according to the invention.

FIG. 5a shows the procurement of a substrate, in this case in the form of a metal foil 1 corresponding to step d) in the main embodiment of the invention.

FIG. 5a' shows the procurement of a substrate, in this case in the form of a metal foil 1 corresponding to step d) in the main embodiment of the invention, in this step a partial protection of the surface of substrate 1 is made using an insulating stencil 9. This stencil may be made from a strippable polymer film or it may be an insulating flexible stencil.

FIGS. 5b and 5b' show the deposition of cathode nanoparticles 24 by electrophoresis on conducting parts of the substrate 1 corresponding to step e) in a main embodiment of the process, followed by consolidation of the coating. In FIG. 5b, the deposition is made over the entire surface and on both faces of the substrate 1, while in FIG. 5b' part of the substrate is protected by the stencil 9.

FIGS. 5c and 5c' show an electrophoretic deposition of electrolyte nanoparticles on the cathode corresponding to step g) in a main embodiment of the process.

The product obtained by the process according to FIGS. 5a to 5c' corresponds to the case in which the substrate is procured in the form of a band, and substrate plates coated with the cathode and the electrolyte are then cut out from the band.

Figure 6A:
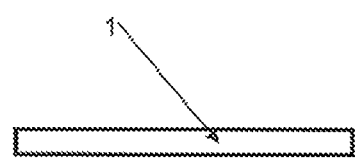
FIGS. 6a, 6a', 6b, 6b', 6c, 6c' show products obtained at different steps in a particular embodiment of the process according to the invention.
Figure 6A:
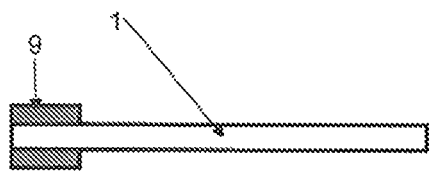
Figure 6B:
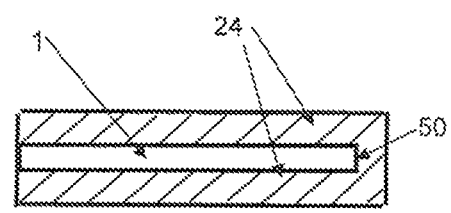
Figure 6B:
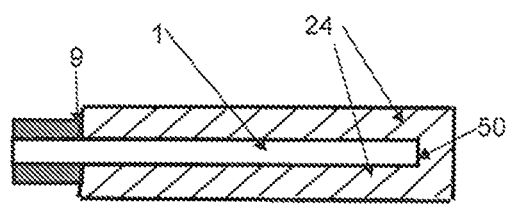
Figure 6C:
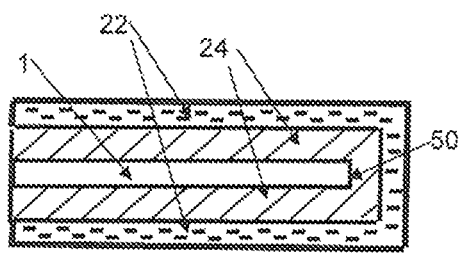
Figure 6C:
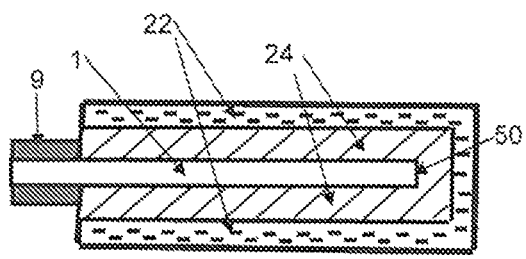

FIGS. 6a to 6c' show products identical to those in FIGS. 5a to 5c', except that the cathode film and the electrolyte film also cover an edge of the substrate. This product is obtained starting from a previously cut out substrate 1 plate on which the cathode and the electrolyte films are deposited.

Figure 7A:
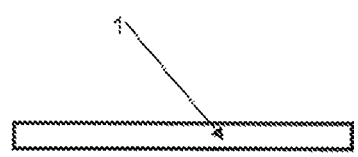
FIGS. 7a, 7a', 7b, 7b', 7c, 7c' show products obtained at different steps in a particular embodiment of the process according to the invention.
Figure 7:
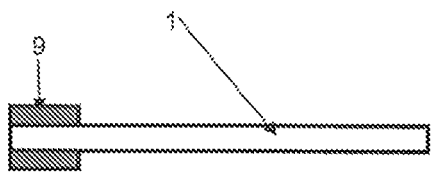
Figure 7B:
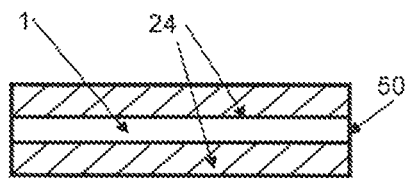
Figure 7B:
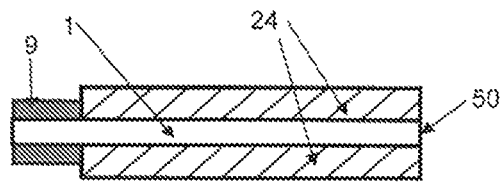
Figure 7C:
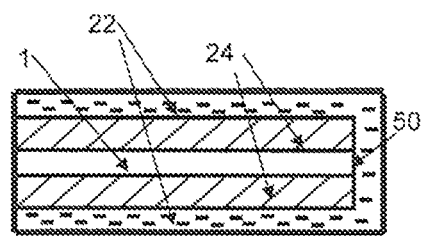
Figure 7C:
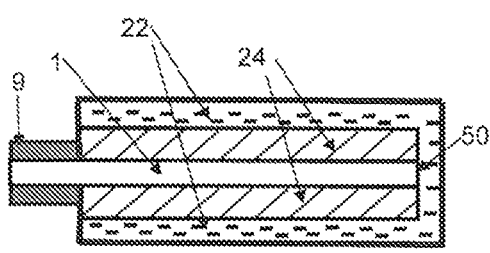

FIGS. 7a to 7c' show products identical to those in FIGS. 5a to 5c', except that the electrolyte film also covers one edge of the substrate. In this embodiment, the electrophoretic deposition of cathode nanoparticles is done on a band that is cut out later, and the electrolyte is deposited after cutting.

Figure 8:
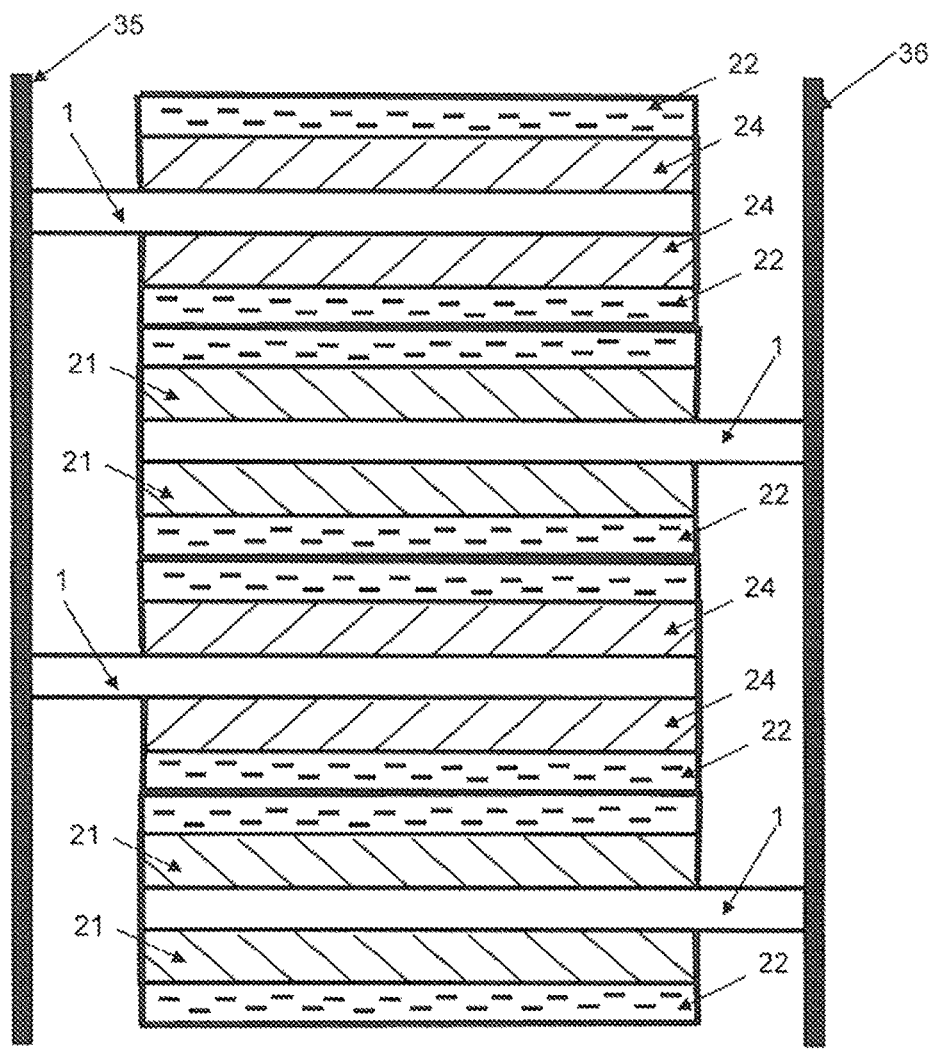

FIG. 8 shows a battery obtained after the process according to the invention. This battery is composed of stacks of electrolyte 22/anode 21/substrate 1/anode 21/electrolyte 22 and electrolyte 22/cathode 24/substrate 1/cathode 24/electrolyte 22, assembled at their electrolyte films. Battery terminations shown in this figure are connected only to the ends of uncoated substrates because they are protected by an insulating stencil during the deposition, to limit risks of short circuits on electrode edges.

Figure 9:
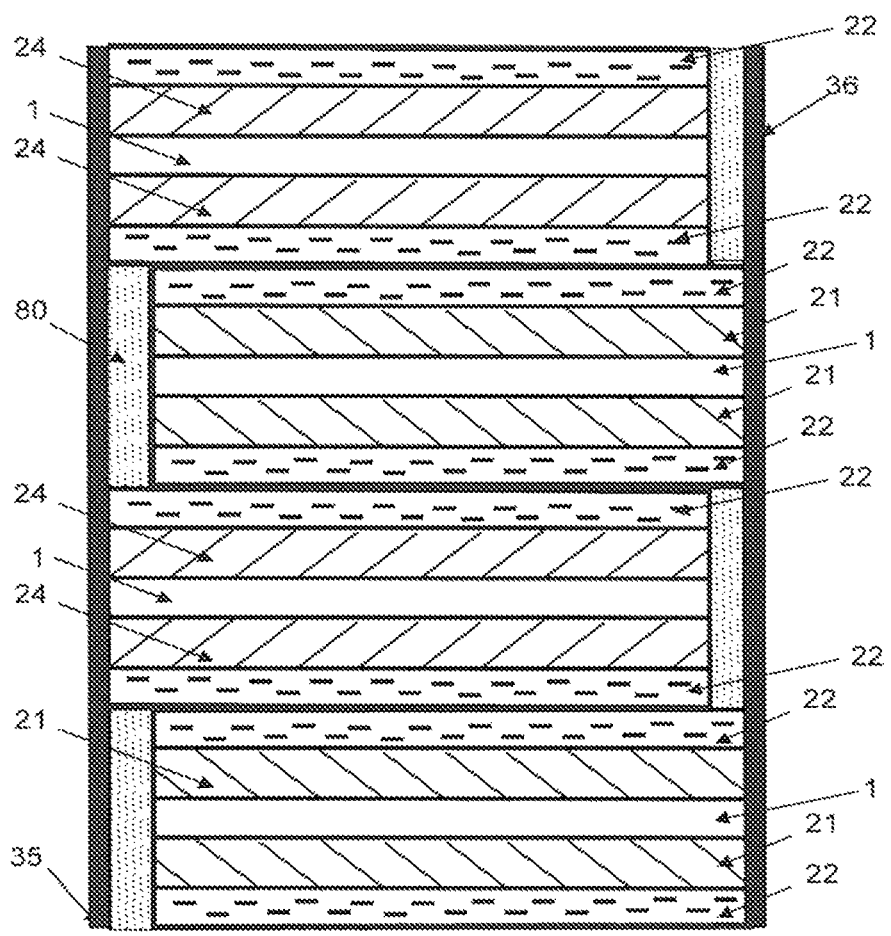

FIG. 9 shows a battery obtained after the process according to the invention. This battery is composed of stacks of electrolyte 22/anode 21/substrate 1/anode 21/electrolyte 22 and electrolyte 22/cathode 24/substrate 1/cathode 24/electrolyte 22, assembled at their electrolyte films. In the battery shown in this figure, the terminations are connected on the slightly offset electrode edges, to limit risks of short circuit on electrode edges.

Figure 10:
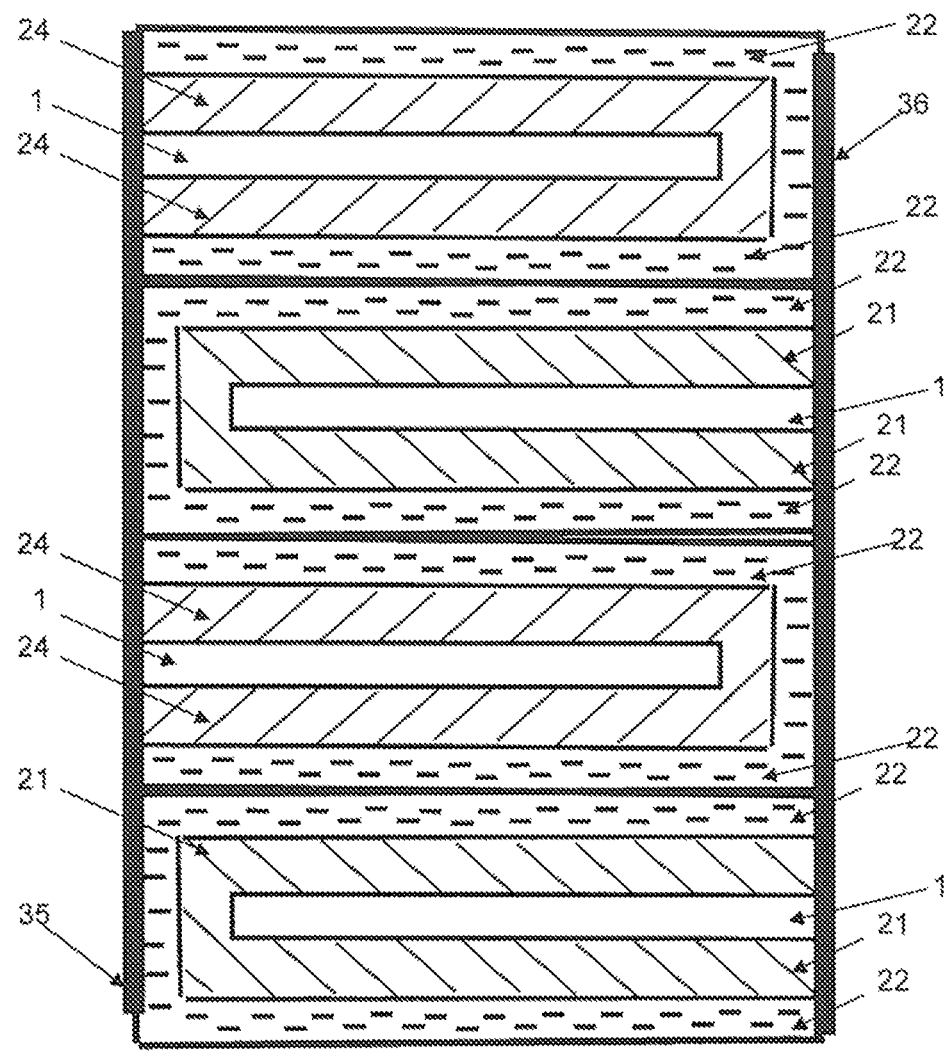

FIG. 10 shows a battery obtained after the process according to the invention. This battery is composed of stacks of electrolyte 22/anode 21/substrate 1/anode 21/electrolyte 22 and electrolyte 22/cathode 24/substrate 1/cathode 24/electrolyte 22, assembled at their electrolyte films. In the battery shown in this figure, some or all of the edges of each stack are coated with anode or cathode, electrolyte materials. This makes it possible to make contacts by pressing a current collector in contact with uncoated zones of edges.

FIG. 11 shows a battery made according to one embodiment similar to that in FIG. 10, except that the stacks are constructed using the embodiments shown in FIGS. 7a to 7c'.

In the embodiments shown in FIGS. 8 to 11, the battery is a three-dimensional multi-film component. This type of component is often designed to be surface mounted on integrated circuits using "pick and place" type techniques. This all-solid-state thin film battery may be made using dimensional standards defined by Electronic Industries Alliance.

The high energy density and power per unit volume obtained with the batteries in FIGS. 8 to 11 is due to the lack of substrate and the presence of a large quantity of stacked batteries connected in parallel.

This three-dimensional component architecture is particularly efficient because the component is not integrated into a package, however it may be necessary to protect the multi-film stack from humidity in air and oxidation so that its performances are not degraded during time and to extend its life. FIG. 25 shows an embodiment of an all-solid-state thin film battery according to FIG. 11 with a multi-film structure, also comprising protective elements 80,81,82,83.

As shown in FIG. 25, a protective film 80 improves the protection provided by the electrolyte film on the top and bottom edges of the battery, to protect the cell from atmospheric elements.

This protection is placed on the top and bottom of the battery, usually in the form of a thin film 80. The thickness and nature of the protective film are determined by the permeability values to be obtained. The required permeability value for the protective film depends particularly on the protective nature of the electrolyte film 22 located below it. In general, a permeability of less than 0.1 µg/m²/day of exposure to air is necessary to guarantee the lifetime of the battery. Resins that can be used to make this protective film non-limitatively include epoxy resins, polyurethanes, acrylics, polypropylene, polyethylene, polyester (polyethylene terephthalate, polyethylene naphthalate). These resins may be polymerizable under UV, for example such as HumiSeal® UV40 type resins made by Humiseal Company.

The protective film 80 is deposited on the top and bottom of the battery. The edges of the electrodes are not protected by this film 80. They remain in potential contact with elements of the atmosphere that can deteriorate performances in the long term.

These edges are coated with a coating containing metal elements 81,82,83, to protect these edges located on the sides of the battery while maintaining the electric connection, the coatings preferably projecting beyond the ends 84 so as to cover the polymer films 80 thus guaranteeing optimum protection of the battery.

In some embodiments (not shown), these terminations (coatings containing metal elements) may be made in the form of a single metal film 83, for example tin.

In one preferred embodiment, they may be composed of multi-layer films 81,82,83 as shown in FIG. 25. The different layers 81,82,83 are non-limitatively a conducting polymer film (such as a resin containing silver), a nickel film and a tin film.

Each of the different films has a special function to perform, in addition to their role to provide protection against deterioration by atmospheric gases. The tin film 83 assures weldability of the battery interface. The nickel film 82 protects the polymer film 81 during welding assembly steps. A copper sub-film (not shown) is also deposited under the conducting polymer film in some embodiments.

Since the conducting polymer film 81 is deformable, it can absorb any deformations applied onto the battery welded onto an electronic circuit if deformations are applied onto said circuit. This relatively flexible conducting film can thus prevent any breaks at mechanically loaded interfaces. Furthermore, although materials with inserted lithium used preferentially for fabrication of the battery are considered to be dimensionally stable, they have a certain deformation ratio that depends on their insertion ratio (for example 1% for $Li_4Ti_5O_{12}$ compared with $Li_7Ti_5O_{12}$). Thus, the film 81 can increase the reliability of electrical contacts while absorbing deformations during steps to insert and remove electrode materials.

The terminations thus made and composed of several films protect the edges of electrodes.

In some advantageous embodiments, deposits of polymer film and terminations are made in a completely dry atmosphere (i.e. with a dew point preferably less than −50° C.), and at an ambient temperature regulated at about 20° C. To guarantee the lifetime of the battery, it is essential that the protective films and terminations have barrier properties against atmospheric gases, but it is also essential that there should be no trace of humidity trapped under these coatings during the fabrication steps.

Different connectors can also be soldered onto the ends of batteries in the form of chips. These connectors may be mounted in a final soldering fabrication step (as for solder reflow) in a tunnel-type furnace, by infrared or vapor phase soldering. Thus, it is possible to differentiate between components and interfaces at the last minute without the need to invest in new fabrication stencils or change fabrication procedures. Their connectors can then be in the form of wires, tabs or other.

Finally, this three-dimensional thin film battery architecture does not contain any metal lithium nor organic electrolytes and can therefore be tested before assembly on the board and can be welded without any risk of damage if it is in a partially charged or discharged state.

Protection of the battery is described above with relation to the battery in FIG. 25, however this type of protection can also be used for the embodiments in FIGS. 8, 9, 10, 11. The polymer film 80 may also possibly cover the edges of the stacks. This can be useful particularly in processes for making batteries in FIGS. 8 and 9 for which the edges of electrodes are not coated with electrolyte at all, or are not well coated.

FIG. 12 shows a method of making cuts on anode bands 72 and cathode bands 71, each comprising notches 73, and stacking them subsequently to make battery cells. The notched anode and cathode bands are superposed on each other so that the cut planes A and B coincide with each other. Once the cutouts have been made, alternate stacks like those shown in FIG. 11 are obtained.

Figure 13:
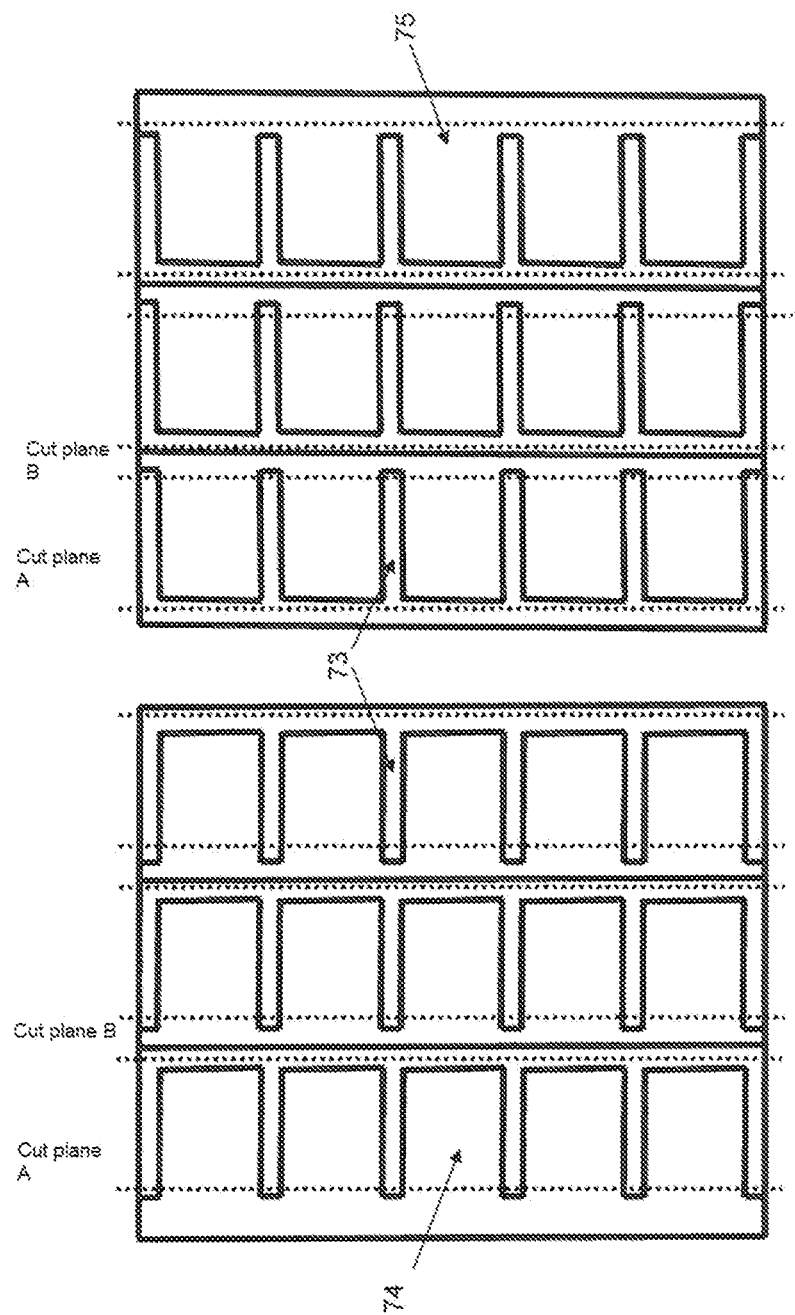

FIG. 13 shows an adaptation of the cut outs in FIG. 12 for working on boards. Cross hatching is not shown to make the figure clearer. Similarly, the anode 74 and cathode 75 boards coated with an electrolyte film are stacked with the cut parts head to foot to make the cut out planes A and B coincide with each other.

For each of the embodiments in FIGS. 5 to 13, the foil of the metal substrate can be replaced by a metalized polymer film, the film being "strippable", in other words it can be dissolved in an appropriate solution or it can be peeled off.

Figure 14A:
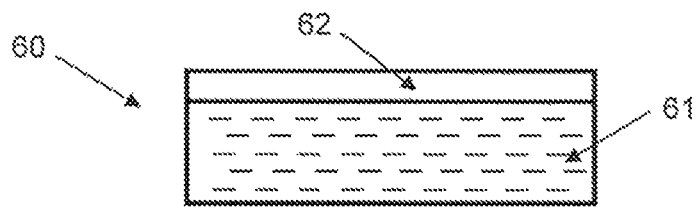
FIGS. 14a, 14b, 14c, 14d show products obtained at different steps in another particular embodiment of the process according to the invention in which the substrate on which the electrodes are deposited is a metalized polymer band.

FIG. 14a shows a procured substrate 60, in this case in the form of a "strippable" polymer film 61 coated with a metal film 62 corresponding to step d) in the main embodiment of the invention.

Figure 14B:
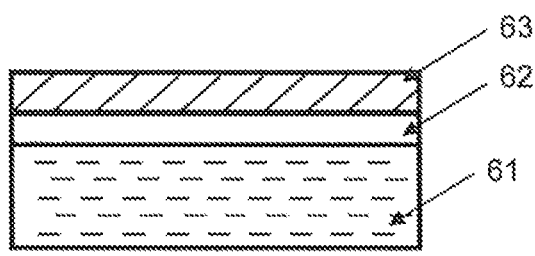

FIG. 14b shows electrophoretic deposition of cathode nanoparticles 63 on the conducting parts of the substrate 60 corresponding to step e) in a main embodiment of the process.

Figure 14C:
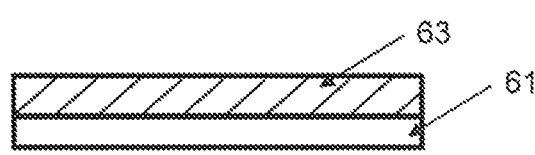

FIG. 14c shows stripping (or peel-off) of the polymer film.

Figure 14D:
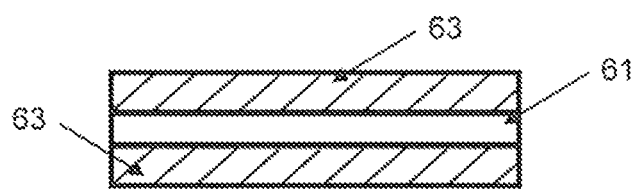

FIG. 14d shows the deposition of cathode nanoparticles 63 on the metal film 62 exposed in the step in FIG. 14c.

Figure 15A:
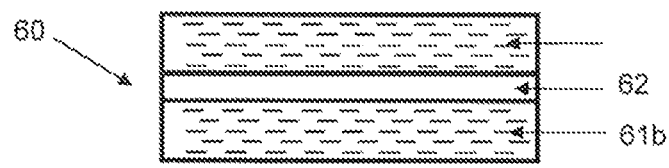
FIGS. 15a, 15b, 15c, 15d, 15e, 15f show products obtained at different steps in another particular embodiment of the process according to the invention, in which the substrate on which the electrodes are deposited is composed of bands of photosensitive polymer or polymer that can be used to make a stencil surrounding a metal film.

FIG. 15a shows a procured substrate 60, in this case in the form of a metal film 62 coated on both sides with a film of photosensitive polymer resin 61a, 61b, corresponding to step d) in the main embodiment of the invention.

Figure 15B:
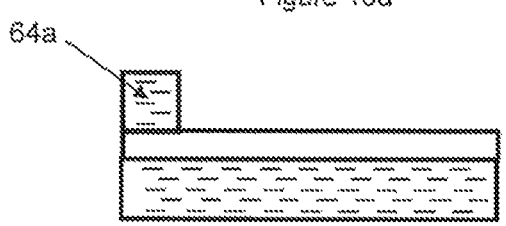

FIG. 15b shows the stencil made with the polymer 61a partially insolated and developed on one of the faces of the metal film 62, including production of a stencil 64a.

Figure 15C:
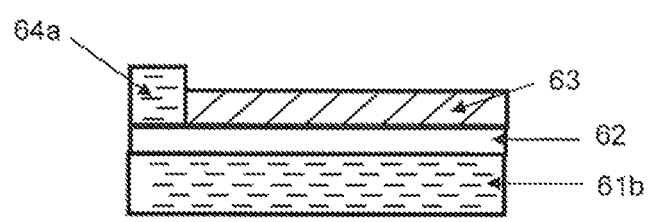

FIG. 15c shows the electrophoretic deposition of cathode nanoparticles 63 on the conducting parts of the substrate 60 (part not coated with polymer or photosensitive resin) corresponding to step e) in the main embodiment of the process.

Figure 15D:
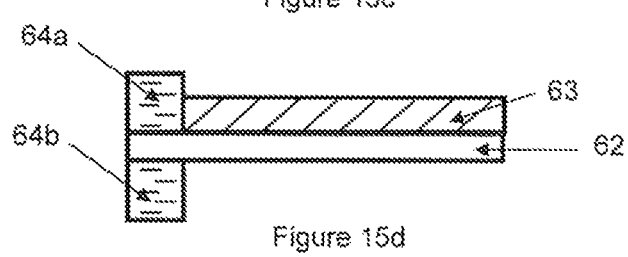

FIG. 15d shows the stencil made with the partially insolated polymer 61b developed on the other face of the metal film 62, including production of a stencil 64b.

Figure 15E:
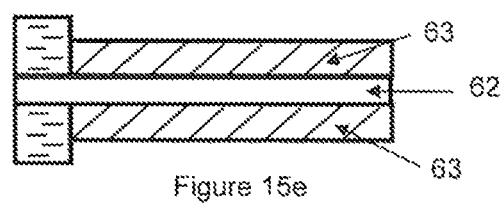

FIG. 15e shows the electrophoretic deposition of cathode nanoparticles 63 on conducting parts of the substrate 60 (part of the metal film 62 coated with neither photosensitive polymer or resin, nor cathode particles 63) corresponding to step e) in a main embodiment of the process.

Figure 15F:
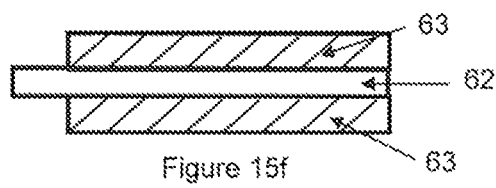

FIG. 15f shows stripping of the stencils 64a, 64b.

FIG. 16a shows procurement of a substrate, in this case in the form of an insulating plate 65 coated partially with metal films 68a, 68b corresponding to step d) in the main embodiment of the invention.

FIG. 16b shows the electrophoretic deposition of cathode nanoparticles 63 on the metal part of the substrate 68a corresponding to step e) in a main embodiment of the process.

FIG. 16c shows the electrophoretic deposition of cathode nanoparticles 66 on the metal part of the substrate 68a coated with the cathode 63, corresponding to step f) in a main embodiment of the process.

FIG. 16d shows a sectional view of the battery after deposition of the anode thin film.

FIG. 20 shows the compact deposition of nanoparticles with non-homogeneous sizes 2, 17. Such a stack can be obtained directly by co-deposition of a mix of different sizes of nanoparticles or by successive depositions of different sizes of particles.

FIG. 21a shows the lithium diffusion path in a compact stack of particles impregnated with electrolyte. There is a surface contact zone 76 between the particles and the electrolyte contained in the pores. The diffusion path is only slightly resistive. There is also a point contact zone 77 between particles. Lithium diffusion on this point contact is limited.

FIG. 21b shows the development of the interface between the particles during consolidation. The diffusion path 78 can be achieved in the solid-state phase without the use of a liquid electrolyte in the pores.

FIG. 21c shows the structure obtained after consolidation of a composite deposit containing a "meltable" phase 79.

FIG. 21d diagrammatically shows the influence of consolidation on the type of porosity. This point can illustrate and explain that the porosity of batteries according to the invention is less than 30%. At this level, pores are closed and can no longer be impregnated with electrolyte.

The performances (Wh/l, Wh/kg) of a thin film battery are better when the porosity is low.

Electrophoresis makes it possible to deposit films with compositions that are difficult or even impossible to obtain by a vacuum process; for example, polymers can be incorporated into a mineral phase, or deposits can be made of spinel ($LiMn_2O_4$) or olivine ($LiMPO_4$ where M advantageously represents Fe, Co or Mn) type compounds that are difficult to achieve by vacuum deposition.

Batteries that can be obtained using the process according to the invention are different from known batteries in several structural ways. The electrolyte is entirely solid. The films can have a composition that cannot be obtained by vacuum deposition. The porosity of anode, cathode and solid electrolyte films, expressed by the ratio between the real density and the theoretical density of the films, is low and values of less than 10% or even 5% can be obtained, while the porosity that can be obtained with known processes is generally more than 20%. The grain size can be much lower than in thin film batteries deposited by inks because the film deposited by electrophoresis is denser, even before consolidation. Since consolidation is done at a relatively low temperature, the films can incorporate polymers.

Advantageously, in batteries according to the invention, all the collectors may be made of aluminum which is less expensive than copper or silver. It is often impossible to use aluminum in batteries according to the state of the art, or the use of aluminum is limited to the cathode, either because their fabrication requires excessively high temperatures compared with the melting point of aluminum, or because an aluminum connector could be corroded by lithium salts contained in the electrolytes and by the extreme voltages applied to collectors in the batteries. The fact that a single material is used for the collectors in a particular battery facilitates recycling.

Another structural characteristic of batteries according to the invention is that the electrolyte film covers part of the edge of the anode and cathode films, at least on one side.

One final structural characteristic of batteries according to the invention is their dimensional stability during use: with some electrode materials (particularly spinels, $Li_4Ti_5O_{12}$, olivines) that are difficult to achieve by vacuum deposition, lithium insertion does not cause any volume variations. This extends the lifetime of batteries, particularly batteries manufactured by stacking several "collector/anode/electrolyte/cathode/collector" structures.

The invention has many advantages. The process for fabrication of anode, solid electrolyte and cathode films by electrophoresis is simple, fast and inexpensive. The process does not have to be used in a dry atmosphere, unlike processes according to the state of the art making use of lithium salts or metal lithium that are very sensitive to humidity. The batteries obtained have a high power density; they also have a high energy density (about twice as high as known lithium ion batteries) due to the very low porosity and the thinness of electrolyte films. The lack of any corrosive lithium salts extends the life of the battery, reduces the risk of an internal short circuit and also increases its resistance to temperature; consequently, batteries according to the invention can be wave-soldered, unlike known lithium ion thin film batteries. Thus, batteries according to the invention are safer. Furthermore, their self-discharge rate is lower because the electrolyte film covers the edges of the electrodes.

EXAMPLES

The process according to the invention can be implemented as follows.

Example 1—Fabrication of a Thin Film Battery

1—Preparation of the SP+ Colloidal Suspension

A $LiMn_2O_4$ powder composed of clusters of nanoparticles is synthesized to obtain the SP+ suspension of P+ particles for the cathode material. This is done using Pechini's process described in the article "*Synthesis and Electrochemical Studies of Spinel Phase $LiMn_2O_4$ Cathode Materials Prepared by the Pechini Process*", W. Liu, G. C. Farrington, F. Chaput, B. Dunn, J. Electrochem. Soc., vol. 143, No. 3, 1996. After the calcination step at 600° C., the powder contains clusters with a size of between 50 nm and 100 nm.

This powder is then put into suspension in ethanol at a concentration of 20 g/l.

The SP+ suspension is poured into the bowl of a ball grinder previously filled with 0.1 mm diameter ceramic balls. Grinding takes place for 2 hours in the presence of a few milliliters of polyacrylic acid that acts as a complexing agent, to obtain a colloidal solution with particles ($D_{50}$) with a size equal to 30 nm. The zeta potential of the suspension is equal to about 65 mV.

2—Deposition of the Cathode Film

The $LiMn_2O_4$ particles contained in the suspension are then deposited on a substrate composed of a 100 μm thick copper sheet. The deposition is made by applying a voltage of 100 V between the substrate and the counter electrode, both immersed in a colloidal suspension, until a 4 μm thick deposit is obtained. This deposit is then compacted at a pressure of 500 MPa, dried for 1 hour at 90° C. before being consolidated by a 500° C. heat treatment for 1 hour. The porosity of the deposit thus obtained is less than 10%.

3—Preparation of the SP− Colloidal Suspension

Initially, a $Li_4Ti_5O_{12}$ powder composed of nanometric sized particle clusters is synthesized using the process described in the article "*Phase pure nanocrystalline $Li_4Ti_5O_{12}$ for a lithium-ion battery*" by M. Kalbac et al., J Solid State Electrochem (2003) 8: 2-6. The synthesis is done by mixing a solution of LiOEt at 0.9M and titanium butoxide (IV) in ethanol, under argon. The mix is made with the stoechiometric ratio of Li/Ti=4:5. The solution obtained is then hydrolyzed with an aqueous solution at 4% of polyethylene glycol. The mixture is then mixed for 11 hours before being evaporated at 40° C. to obtain a viscous paste. An $Li_4Ti_5O_{12}$ powder is obtained after calcination at 500° C.

This powder is then put into suspension in alcohol at a concentration of 20 g/l into which small quantities of carbon black nanoparticles have been added. The suspension is poured into the bowl of a ball grinder previously filled with 0.1 mm diameter ceramic balls. Grinding takes place for 3 hours in the presence of polyacrylic acid that acts as a complexing agent to obtain a colloidal solution with particles with a size ($D_{50}$) equal to about 40 nm. The zeta potential of the suspension is equal to 60 mV.

4—Deposition of the Anode Film $Li_4Ti_5O_{12}$ and carbon particles contained in the suspension are then deposited on a substrate composed of a 100 μm thick copper sheet. The deposition is made by applying a voltage of 200 V between the substrate and a counter electrode, both immersed in the colloidal suspension, until a 4 μm thick deposit is obtained. This deposit is then compacted at a pressure of 500 MPa, dried for 1 hour at 90° C. before being consolidated by heat treatment at 450° C. for 2 hours. The porosity of the deposit thus obtained is less than 10%.

5—Preparation of the SPn Colloidal Suspension

The first step in making the colloidal suspension containing electrolyte particles is to synthesize nanometric powders of $Li_{1.3}Al_{0.3}Ti_{1.7}(PO_4)_3$ using the process described in the "*Thin-film lithium-ion battery derived from $Li_{1.3}Al_{0.3}Ti_{1.7}(PO_4)_3$ sintered pellets*" publication by Xiao et al, published in Trans. Nonferrous Me. Soc. China 16 (2006), p. 281-285. $Li(CH_3\text{-}000).2H_2O$ and $Al(NO_3)_3.9H_2O$ are dissolved in $CH_3OCH_2CH_2OH$ in stoechiometric quantities, and $PO(OC_4H_9)_4$ is then added to this mix while stirring. After adding the stoechiometric quantity of demineralized water for hydrolysis of alkoxides, the suspension obtained is dried at 140° C. for 4 hours to form an $Li_{1.3}Al_{0.3}Ti_{1.7}(PO_4)_3$ gel. This gel is then calcinated at 900° C. for 2 hours to obtain an agglomerated powder of $Li_{1.3}Al_{0.3}Ti_{1.7}(PO_4)_3$; this powder is then put into suspension in ethanol at a concentration equal to 20 g/l.

The suspension is poured into the bowl of a ball mixer previously filled with 0.1 mm diameter ceramic balls. Grinding takes place for 3 hours in the presence of polyacrylic acid that acts as a complexing agent, to obtain a colloidal solution with particles with size $D_{50}$ equal to 15 nm. The zeta potential of the suspension is of the order of 60 mV.

6—Making the Electrochemical Cell

The $Li_{1.3}Al_{0.3}Ti_{1.7}(PO_4)_3$ particles obtained in the suspension are subsequently deposited on the consolidated deposit of $LiMn_2O_4$, by applying a voltage of 100 V between the substrate and a counter electrode both immersed in the colloidal suspension, until a 2 μm thick deposit is obtained.

The cathode ($LiMn_2O_4$) coated with the thin film of electrolyte nanoparticles (not sintered) is then covered by the anode. The collector+/cathode/electrolyte/anode/collector stack is then compressed at 400 MPa and then consolidated at 300° C. for 30 minutes until a fully compact and inorganic Li-ion battery cell is obtained.

Example 2—Fabrication of an Anode Film

1—Preparation of the Substrate

A 15 μm thick aluminum foil is procured. The foil is then placed in an unwinder and is placed on a support frame, so as to create a rigid support structure for the aluminum foil without creasing the foil. This support frame is designed with an insulating external surface with the presence of electrical contacts on the internal surface. These internal conducting surfaces are in contact with the aluminum foil and impose a potential on it. The aluminum foil in its frame is then immersed in a surface cleaning bath. This cleaning is done by immersion in a bath of detergent made by NGL technologie under ultrasound followed by rinsing with distilled water.

Once the surface has been cleaned, we performed an electro-polishing treatment in a solution with chemical composition equal to 80% absolute ethanol, 13.8% distilled water and 6.2% perchloric acid at 70%. The aluminum was electro-polished at a polarization under 15V with a lead counter electrode. The treatment bath was cooled to prevent overheating due to high current densities.

After the electro-polishing treatment, the surface was rinsed with distilled water.

2—Preparation of an SP− Colloidal Suspension

This colloidal suspension was made without the addition of stabilizers, to guarantee an excellent purity of the electrode. We did this by preparing a colloidal suspension of $Li_4Ti_5O_{12}$ in alcohol (for example ethanol) by grinding and dispersing $Li_4Ti_5O_{12}$ nanoparticles.

$Li_4Ti_5O_{12}$ nanoparticles were purchased from Aldrich, and then ground in ethyl alcohol at a concentration of 10 g/l. After this grinding-dispersion step, the suspension was ultrasonically irradiated and then allowed to settle. We drew off only the float of the suspension after settlement in order to be sure of obtaining a monodispersed colloidal suspension of nanoparticles with no clusters larger than 100 nm.

A suspension was thus obtained containing no stabilizer. We observed that the stability of nanocolloids depended largely on the particle size and their concentration in the suspension.

When the particle size is close to about ten nanometers, particles can be stable in suspensions without any added stabilizers. The high specific area of these particles and their low mass are such that interactions result in making the system behave like a real gas that can condense resulting in a colloidal crystal. Electrophoretic depositions of these nanoparticles result in condensation of this so-called colloidal crystal phase on the surface of the substrate.

3—Deposition of the Anode Film

A thin film of $Li_4Ti_5O_{12}$ particles was deposited by electrophoresis on the electro-polished aluminum foil obtained in step 1 above.

The deposition conditions used were 10V/cm, which gave a compact deposition about 0.5 μm thick after only thirty seconds of anaphoresis.

The deposition was then annealed at 500° C. for 1 hour and then pressed at 50 MPa.

The result obtained was an anode.

A cyclic voltammetry curve was then plotted on this electrode at 0.1 V/sec in order to validate its insertion properties with regard to lithium ions. FIG. 23a shows an illustration of the curve thus obtained.

Example 3—Fabrication of an Anode Film

The substrate is the same as that described in example 2.

The preparation process for the suspension of SP− particles is similar to that used in example 2, except that the suspension of $Li_4Ti_5O_{12}$ particles was diluted to 2 g/l and that citric acid was added to the suspension at a concentration of 1.10-3 M. The suspension was ultrasonically irradiated and the float was retrieved after settlement.

SP− particles were deposited under the same conditions as in example 2. The deposit was then dried and then consolidated at 50 MPa.

A cyclic voltammetry curve was plotted on this electrode at 0.1 V/sec in order to validate its insertion properties with regard to lithium ions. The curve is shown in FIG. 23b.

The electrode thus obtained is entirely solid and bonds onto the substrate without the addition of PVDF type binders in the deposit.

Example 4—Fabrication of a Cathode Film

1—Preparation of a Colloidal Suspension of SP+ Particles

Nanometric $LiMn_{1.5}Ni_{0.4}Cr_{0.1}O_4$ powders were synthesized using the process described in example 6a below. These nanopowders were ground and dispersed in alcohol to obtain a 20 g/l suspension of $LiMn_{1.5}Ni_{0.4}Cr_{0.1}O_4$. Grinding-dispersion was continued until the size of particles in suspension was 30 nm. This suspension was then diluted in a ketone-based solvent to obtain a 5 g/l suspension. The deposition conditions were 70 mV/cm, which gave a deposit of about 1 μm after only a few seconds of anaphoresis.

Example 5—Fabrication of an Electrolyte Film

1—Preparation of a Colloidal Suspension of SPn Particles

Nanometric $Li_{1.3}Al_{0.3}Ti_{1.7}(PO_4)_3$ powders were synthesized in the same way as in example 1.

The nanometric $Li_{1.3}Al_{0.3}Ti_{1.7}(PO_4)_3$ powders were put into colloidal suspension in ethyl alcohol by grinding-dispersion. No stabilizer was added to the colloidal suspension which had a dry extract of 10 g/l. The suspension thus obtained was perfectly stable.

The size grading distribution of nanoparticles in colloidal suspensions was determined by DLS (Dynamic Light Scattering), also called photon correlation spectroscopy with a commercial Zetasizer apparatus made by Malvern Instruments. The measurement principle is based on Brownian motion of particles in suspension. This measurement technique quantifies the diffusion rate of particles in suspension, to deduce their hydrodynamic radius. DLS measurements shown in FIG. 24 illustrate the size distribution of particles in suspension.

The average size of particles in suspension is 60 nm. As before, we worked almost exclusively with floats of suspensions after settlement, to be sure of not drawing off any clusters.

Example 6—Synthesis of Nanoparticles that can be Used as Anode, Cathode or Electrolyte Materials a) $LiMn_{1.5}Ni_{0.4}Cr_{0.1}O_4$ Small quantities of $Li_2CO_3$ powder are dissolved in a mix of citric acid and ethylene glycol heated to 70° C. A release of $CO_2$ is observed for each added portion. The mix temperature is increased to 90° C., and stoechiometric quantities of $Mn(NO_3)_2 \cdot 4H_2O$, $Ni(NO_3)_2 \cdot 6H_2O$ and $Cr(NO_3)_2 \cdot 9H_2O$ are added to this final solution and the temperature of the mix is then increased to 140° C. to obtain a hard bubbled mass. This mass is then placed in the drying oven at 250° C. until a powder is obtained. The powder obtained is then calcinated at 800° C. for 6 h. The powder obtained can be used to prepare cathode films in Li-ion type batteries.

b) $LiMnPO_4$

An $Li_3PO_4$ powder and an $MnSO_4 \cdot 4H_2O$ powder are ground in stoechiometric quantities in a mortar. The ground powder obtained is placed in an autoclave at 190° C. for 12 h. The product obtained is washed, centrifuged and then dried at 40° C. for one night. The powder obtained can be used to prepare cathode films in Li-ion type batteries.

c) $LiFePO_4$

An $Li_3PO_4$ powder and an $FeSO_4 \cdot 7H_2O$ powder are ground in stoechiometric quantities in a mortar. The ground powder obtained is placed in an autoclave at 190° C. for 12 h. The product obtained is washed, centrifuged and then dried at 40° C. for one night. The powder obtained can be used to prepare cathode films in Li-ion type batteries.

d) $Li_{2.9}PO_{3.3}N_{0.36}/Li_{2.9}PO_{3.3}N_{0.46}$ (LIPON)

A nanometric $Li_3PO_4$ powder that has not received any high temperature heat treatment is placed in an alumina nacelle placed in a tubular furnace. The powder is then heat treated at 650° C. for 2 h under an ammonia atmosphere. The powder thus obtained can be used to prepare electrolyte films in Li-ion type batteries.

The invention claimed is:
1. A process for fabrication of an all-solid-state thin film battery, the process comprising:
depositing, using an electrophoresis process without any binders, an anode film comprising an anode active material on a first current collector and a cathode film comprising a cathode active material on a second current collector;
depositing, using an electrophoresis process without any binders, an electrolyte film comprising an electrolyte material on at least one of the anode film and the cathode film;
stacking the anode film formed on the first current collector and the cathode film formed on the second current collector to form a stacked structure having a collector/anode/electrolyte/cathode/collector stacked structure to obtain an all-solid-state thin film battery; and
consolidating, to a porosity of less than 15%, at least one of the anode film, the cathode film, and the electrolyte film to increase the density of the at least one of the anode film, the cathode film, and the electrolyte film, by mechanical consolidation using one or more of isostatic pressing or hot pressing, wherein:
the anode active material, the cathode active material, and the electrolyte material comprise nanoparticles having an average size of less than 100 nm,
the respective thicknesses of the deposited anode film, the deposited cathode film, and the deposited electrolyte film are less than 5 μm, and
the consolidating of the at least one of the anode film, the cathode film, and the electrolyte film is further performed under a vacuum or an inert atmosphere.

2. The process of claim 1, further comprising, after the stacking, consolidating to a porosity of less than 10% at least one of the anode film, the cathode film, and the electrolyte film to increase the density of the at least one of the anode film, the cathode film, and the electrolyte film mechanically consolidation using one or more of isostatic pressing or hot pressing, wherein the consolidation is further performed under a vacuum or an inert atmosphere.

3. The process of claim 1, further comprising, after the stacking, consolidating to a porosity of less than 5% at least one of the anode film, the cathode film, and the electrolyte film to increase the density of the at least one of the anode film, the cathode film, and the electrolyte film by mechanical consolidation using one or more of isostatic pressing or hot pressing, wherein the consolidation is further performed under a vacuum or an inert atmosphere.

4. The process of claim 1, wherein the consolidation further includes a thermal consolidation to be performed before the mechanical consolidation.

5. The process of claim 1, wherein the consolidation further includes a thermal consolidation to be performed after the mechanical consolidation.

6. The process of claim 1, wherein the first current collector and the second current collector are composed of aluminum.

7. The process of claim 6, wherein the aluminum comprises electro-polished aluminum foil.

8. The process of claim 7, wherein the first current collector and the second current collector have a thickness of 1 to 10 μm.

9. The process of claim 1, wherein at least one of the anode active material, the cathode active material and the electrolyte material comprises nanoparticles having an average size of less than 50 nm.

10. The process of claim 1, wherein the anode active material comprises at least one of:
tin oxinitrides ($SnO_xN_y$);
mixed silicon and tin oxinitrides ($Si_aSn_bO_yN_z$ where a>0, b>0, a+b≤2, 0<y≤4, 0<z≤3) (also called SiTON), and $SiSn_{0.87}O_{1.2}N_{1.72}$; and oxinitrides in the form $Si_aSn_bC_cO_yN_z$ where a>0, b>0, a+b≤2, 0<c–10, 0<y<24, 0<z<17; $Si_aSn_bC_cO_yN_zX_n$ and $Si_aSn_bO_yN_zX_n$ where $X_n$ is at least one of the elements F, Cl, Br, I, S, Se, Te, P, As, Sb, Bi, Ge, and Pb;
$Si_xN_y$ type nitrides, $Sn_xN_y$, $Zn_xN_y$, $Li_{3-x}M_xN$ (where M=Co, Ni, Cu); and
$SnO_2$, $Li_4Ti_5O_{12}$, $SnB_{0.6}P_{0.4}O_{2.9}$ oxides.

11. The process of claim 1, wherein the anode active material is chosen from $Si_xN_y$ type nitrides (in which x=3 and y=4), $Sn_xN_y$ type nitrides (in which x=3 and y=4), $Zn_xN_y$ type nitrides (in which x=3 and y=4), and $Li_{3-x}M_xN$ type nitrides (where M+Co, Ni, Cu).

12. The process of claim 1, wherein the anode active material comprises $SiSn_{0.87}O_{1.2}N_{1.72}$.

13. The process of claim 1, wherein the cathode active material comprises at least one of:

$LiMn_2O_4$, $LiCoO_2$, $LiNiO_2$, $LiMn_{1.5}Ni_{0.5}O_4$, $LiMn_{1.5}Ni_{0.5-x}M_xO_4$ oxides (where M is selected from among Al, Fe, Cr, Co, Rh, Nd, other rare earths and in which 0<x<0.1), $LiFeO_2$, $LiMn_{1/3}Ni_{1/3}Ni_{1/3}Co_{1/3}O_4$;
$LiFePO_4$, $LiMnPO_4$, $LiCoPO_4$, $LiNiPO_4$, $Li_3V_2(PO_4)_3$ phosphates; and
all lithiated forms of the following chalcogenides: $V_2O_5$, $V_3O_8$, $TiS_2$, $TiO_yS_z$, $WO_yS_z$, CuS, and $CuS_2$.

14. The process of claim 1, wherein the electrolyte material comprises at least one of:
lithium compounds based on lithium oxinitride and phosphorus (LiPON) in the form $Li_xPO_yN_z$ where x∈2.8 and 2y=3z ∈7.8 and 0.16 ≤z ≤0.4, variants in the form $Li_wPO_xN_yS_z$ where 2x+3y+2z=5=w and 3.2≤x≤x≤3.8, 0.13≤y≤0.4, 0≤z≤0.2, 2.9≤w≤3.3, and in the form $Li_tP_xAl_yO_uN_vS_w$ where 5x+3y=5, 2u+3v+2w=5+t, 2, 9≤t≤3, 3, 0.94≤x≤0.84, 0.094≤y≤0.26, 3.2≤u≤3.8, 0.13≤v≤0.46, 0≤w≤0.2;
lithium compounds based on lithium oxinitride, phosphorus and silicon (LiSiPON);
lithium oxinitrides of the LiBON, LiBSO, LiSiPON, LiSON, thio-LiSiCON, LiPONB types (where B, P and S represent boron, phosphorus and sulfur respectively);
compounds $La_{0.51}Li_{0.34}Ti_{2.94}$, $Li_{3.4}V_{0.4}Ge_{0.6}O_4$, $Li_2O_4$, $Li_2O-Nb_2O_5$, $LiAlGaSPO_4$; and
formulations based on $Li_4SiO_4$, $Li_3PO_4$, $Li_2CO_3$, $B_2O_3$, $Li_2O$, $Al(PO_3)$ 3LiF, $P_2S_3$, $Li_2S$, $Li_3N$, $Li_{14}Z_n(GeO_4)_4$, $Li_{3.6}Ge_{0.6}V_{0.4}O_4$, $LiTi_2(PO_4)_3$, $Li_{0.35}La_{0.55}TiO_3$, $Li_{3.25}Ge_{0.25}P_{0.25}S_4$, $Li_{1.3}Al_{0.3}Ti_{1.7}(PO_4)_3$, $Li_{1+x}Al_xM_{2-x}(PO_4)_3$ (where M=Ge, Ti, and/or Hf, and where 0<x<1), $Li_{1+x+y}Al_xTi_{2-x}Si_yP_{3-y}O_{12}$ (where 0≤x≤1 and 0≤y≤1), and $Li_{1+x+z}M_x(Ge_{1-y}Ti_y)_{2-x}Si_zP_{3-z}O_{12}$ (where 0 x≤0.8; 0≤y≤1.0; 0≤z≤0.6).

15. The process of claim 1, wherein the electrolyte material comprises $Li_{2.9}PO_{3.3}N_{0.45}$.

16. The process of claim 1, wherein the electrolyte material comprises $Li_{1.9}Si_{0.28}P_{1.0}O_{1.1}N_{1.0}$.

17. The process of claim 1, wherein the electrolyte material is chosen from formulations based on 4.9LiI-34, $1Li_2O$-$61B_2O_3$, $0.30Li_2S$-$0.26B_2S_3$-$0.44LiI$, $60Li_2S$-$40SiS_2$, $0.02Li_3PO_4$-$0.98(Li_2S$-$SiS_2)$, $2(Li_{1.4}Ti_2Si_{0.4}P_{2.6}O_{12})$-$AlPO_4$, and $0.7Li_2S$-$0.3P_2S_5$.

18. The process of claim 17, wherein electron conducting and/or lithium ion conducting nanoparticles are deposited at the same time as the electrode material nanoparticles.

19. The process of claim 18, wherein the conducting nanoparticles are composed of one of ceramic or vitroceramic materials chosen from among LIPON type compounds, LISIPON type compounds, $Li_4SiO_4$, $Li_3PO_4$, $Li_2CO_3$, $B_2O_3$, $Li_2O$, $Al(PO_3)_3LiF$, $P_2S_3$, $Li_2S$, $Li_3N$, $Li_{14}Zn(GeO_4)_4$, $Li_{3.6}Ge_{0.6}V_{0.4}O_4$, $LiTi_2(PO_4)_3$, $Li_{1.3}Al_{0.3}Ti_{1.7}(PO_4)_3$, $Li_{0.35}La_{0.55}TiO_3$, $Li_{3.25}Ge_{0.25}P_{0.25}S_4$, $Li_{1+x}Al_xM_{2-x}(PO_4)_3$, with M=Ge, Ti, Hf and 0<x<1, $Li_{1+x+y}Al_xTi_{2-x}Si_yP_{3-y}O_{12}$, $Li_{1+x+z}M_x(Ge_{1-y}Ti_y)_{2-x}Si_zP_{3-z}O_{12}$, (0=<=<0,8; 0=<y=<1,0; 0=<z=<0,6) powder mixtures 4,9LiI-34,$1Li_2O$-$61B_2O_3$, $30Li_2O$-$61B_2O_3$, $30Li_2S$-$26B_2S_3$-$44LiI$, $60Li_2S$-$40SiS_2$, $2Li_3$, $PO_4$-$98(Li_2S$-$SiS_2)$, $(Li_{1.4}Ti_2Si_{0.4}P_{2.6}O_{12})$/ $AlPO_4$(in ratio 2:1), $70Li_2S$-$30P_2S_5$, $LiBO_2$, LiBON, LiBSO, LiSiPON, LiSON, thio-LiSiCON, $La_{0.51}Li_{0.34}TiO_{2.94}$, $Li_{3.4}V_{0.4}Ge_{0.6}O4$, $Li_2O$-$Nb_2O_5$, LiPONB, and $LiAlGaSPO_4$.

20. The process of claim 18, wherein the conducting nanoparticles are $Li_{2.9}PO_{3.3}N_{0.46}$.

21. The process of claim 18, wherein the conducting nanoparticles are $Li_{1.9}Si_{0.2}P_{1.0}O_{1.1}N_{1.0}$.

22. The process of claim 1, wherein at least one of the anode active material, the cathode active material, and the electrolyte material comprises nanoparticles having an average size of less than 30 nm.

23. A process for fabrication of an all-solid-state thin film battery, the process comprising:
- depositing, using an electrophoresis process without any binders, a film of anode active material comprising nanoparticles having an average size of less than 100 nm on a first current collector, and a film of cathode active material comprising nanoparticles having an average size of less than 100 nm, on a second current collector;
- depositing on at least one of the film of anode materials and the film of cathode materials using an electrophoresis process without any binders, a film of solid electrolyte material comprising nanoparticles having an average size of less than 100 nm;
- stacking the film of anode materials formed on the current collector and the film of cathode materials formed on the current collector to form a stacked structure having a collector/anode/electrolyte/cathode/collector stacked structure to obtain an all-solid-state thin film battery; and
- consolidating, to a porosity of less than 15%, at least one of the film of anode materials, the film of cathode materials, and the film of solid electrolyte materials to increase the density of the at least one of the film of anode materials, the film of cathode materials, and the film of solid electrolyte materials, by thermal consolidation and mechanical consolidation, wherein:
- the respective thicknesses of the deposited film of anode materials, the deposited film of cathode materials, and the deposited solid electrolyte materials are less than 5 µm, and
- the consolidation is further performed under a vacuum or an inert atmosphere, the at least one of the film of anode materials, the film of cathode materials, and the film of solid electrolyte materials.

* * * * *